(12) United States Patent
Lee et al.

(10) Patent No.: US 11,968,555 B2
(45) Date of Patent: Apr. 23, 2024

(54) METHOD OF TRANSMITTING UPLINK SIGNALS, AND DEVICE THEREFOR

(71) Applicant: LG ELECTRONICS INC., Seoul (KR)

(72) Inventors: Eunjong Lee, Seoul (KR); Heejeong Cho, Seoul (KR); Seungjune Yi, Seoul (KR); Jeonggu Lee, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 392 days.

(21) Appl. No.: 17/299,196

(22) PCT Filed: Dec. 12, 2019

(86) PCT No.: PCT/KR2019/017544
§ 371 (c)(1),
(2) Date: Jun. 2, 2021

(87) PCT Pub. No.: WO2020/122617
PCT Pub. Date: Jun. 18, 2020

(65) Prior Publication Data
US 2022/0078650 A1     Mar. 10, 2022

(30) Foreign Application Priority Data

Dec. 12, 2018   (KR) .................. 10-2018-0160004
Dec. 14, 2018   (KR) .................. 10-2018-0161513
Jan. 15, 2019   (KR) .................. 10-2019-0005108

(51) Int. Cl.
*H04W 24/10*     (2009.01)
*H04W 24/08*     (2009.01)
(Continued)

(52) U.S. Cl.
CPC .......... *H04W 24/10* (2013.01); *H04W 24/08* (2013.01); *H04W 72/0446* (2013.01); *H04W 72/0453* (2013.01); *H04W 72/23* (2023.01)

(58) Field of Classification Search
CPC . H04W 24/10; H04W 24/08; H04W 72/0446; H04W 72/0453; H04W 72/23; H04W 72/04
(Continued)

(56) References Cited

U.S. PATENT DOCUMENTS

2016/0373952 A1   12/2016   Lee et al.
2017/0006566 A1   1/2017   Zhang et al.
(Continued)

FOREIGN PATENT DOCUMENTS

WO   WO-2019210969 A1 * 11/2019     ........ H04W 72/1247
WO   WO-2020088744 A1 * 5/2020     ........... H04L 5/0044

OTHER PUBLICATIONS

Qualcomm Incorporated, "Introduction of gaps for RSTD measurement for eMTC/FeMTC UEs", 3GPP TSG-RAN WG4 Meeting #84, Aug. 21-25, 2017, R4-1708434.

*Primary Examiner* — Rownak Islam
(74) *Attorney, Agent, or Firm* — BRYAN CAVE LEIGHTON PAISNER LLP

(57) ABSTRACT

In the present disclosure, a UE receives configuration information regarding a measurement gap (MG); transmits a MG skip indication associated with the MG; and transmits uplink signals during the MG.

14 Claims, 19 Drawing Sheets

(51) Int. Cl.
*H04W 72/0446* (2023.01)
*H04W 72/0453* (2023.01)
*H04W 72/23* (2023.01)

(58) Field of Classification Search
USPC .......................................................... 370/329
See application file for complete search history.

(56) References Cited

U.S. PATENT DOCUMENTS

| | | |
|---|---|---|
| 2017/0127397 A1 | 5/2017 | Hahn et al. |
| 2018/0227785 A1 | 8/2018 | Yin et al. |
| 2018/0324619 A1* | 11/2018 | Harada ................. H04W 24/10 |
| 2019/0021017 A1* | 1/2019 | Nagaraja ............... H04W 72/51 |

* cited by examiner (a) User Plane Protocol Stack (b) Control Plane Protocol Stack

METHOD OF TRANSMITTING UPLINK SIGNALS, AND DEVICE THEREFOR

This application is the National Stage filing under 35 U.S.C. 371 of International Application No. PCT/KR2019/017544 filed on Dec. 12, 2019, which claims priority to Korean Patent Application Nos. 10-2018-0160004 filed on Dec. 12, 2018; 10-2018-0161513 filed on Dec. 14, 2018 and 10-2019-0005108 filed on Jan. 15, 2019, the contents of which are hereby incorporated by reference herein in their entirety.

TECHNICAL FIELD

The present invention relates to a wireless communication system.

BACKGROUND ART

Introduction of new radio communication technologies has led to increases in the number of user equipments (UEs) to which a base station (BS) provides services in a prescribed resource region, and has also led to increases in the amount of data and control information that the BS transmits to the UEs. Due to typically limited resources available to the BS for communication with the UE(s), new techniques are needed by which the BS utilizes the limited radio resources to efficiently receive/transmit uplink/downlink data and/or uplink/downlink control information.

DISCLOSURE

Technical Problem

Various types of signals, including data signals and control signals, are communicated via the UL and DL. Scheduling of such communications is typically performed, to achieve improved efficiency, latency, and/or reliability. Overcoming delay or latency has become an important challenge in applications whose performance critically depends on delay/latency.

The technical objects that can be achieved through the present invention are not limited to what has been particularly described hereinabove and other technical objects not described herein will be more clearly understood by persons skilled in the art from the following detailed description.

Technical Solution

As an aspect of the present disclosure, provided herein is a method for transmitting uplink signals by a user equipment (UE) in a wireless communication system. The method comprises: receiving configuration information regarding a measurement gap (MG); transmitting a MG skip indication associated with the MG; and transmitting the uplink signals during the MG.

As another aspect of the present disclosure, provided herein is a user equipment (UE) of transmitting uplink signals in a wireless communication system. The UE comprises: a transceiver; at least one processor; and at least one computer memory operably connectable to the at least one processor and storing instructions that, when executed, cause the at least one processor to perform operations. The operations comprise: receiving configuration information regarding a measurement gap (MG); transmitting a MG skip indication associated with the MG; and transmitting the uplink signals during the MG.

In each aspect of the present disclosure, the MG skip indication may be transmitted when conditions for the UE to skip measurements during the MG are satisfied. The conditions may comprise data of a specific logical channel is available for transmission in the UE.

In each aspect of the present disclosure, the uplink signals may include the data of the specific logical channel.

In each aspect of the present disclosure, the configuration information may include information regarding a resource used for the MG skip indication. The MG skip indication may be transmitted using the resource based on the configuration information.

In each aspect of the present disclosure, the MG skip indication may be transmitted when data of a specific logical channel is available for transmission in the UE at the time when the resource configured for the MG skip indication is present.

In each aspect of the present disclosure, the UE may skip measurements during the MG.

In each aspect of the present disclosure, the conditions may further comprise: channel quality of a serving cell is above a threshold.

In each aspect of the present disclosure, the conditions may further comprise: a timer for prohibiting the UE from skipping measurements during MGs is not running. The UE may perform the measurements during each MG while the timer is running.

In each aspect of the present disclosure, the conditions may further comprise: a counter for prohibiting the UE from skipping measurements during MGs does not reach a specific value. The UE may increment the counter by 1 per MG, and performs the measurements during each MG while the counter does not reach the specific value.

The above technical solutions are merely some parts of the implementations of the present disclosure and various implementations into which the technical features of the present disclosure are incorporated can be derived and understood by persons skilled in the art from the following detailed description of the present disclosure.

Advantageous Effects

In some scenarios, implementations of the present disclosure may provide one or more of the following advantages. In some scenarios, radio communication signals can be more efficiently transmitted and/or received. Therefore, overall throughput of a radio communication system can be improved.

According to some implementations of the present disclosure, delay/latency occurring during communication between a user equipment and a BS may be reduced.

Also, signals in a new radio access technology system can be transmitted and/or received more effectively.

It will be appreciated by persons skilled in the art that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
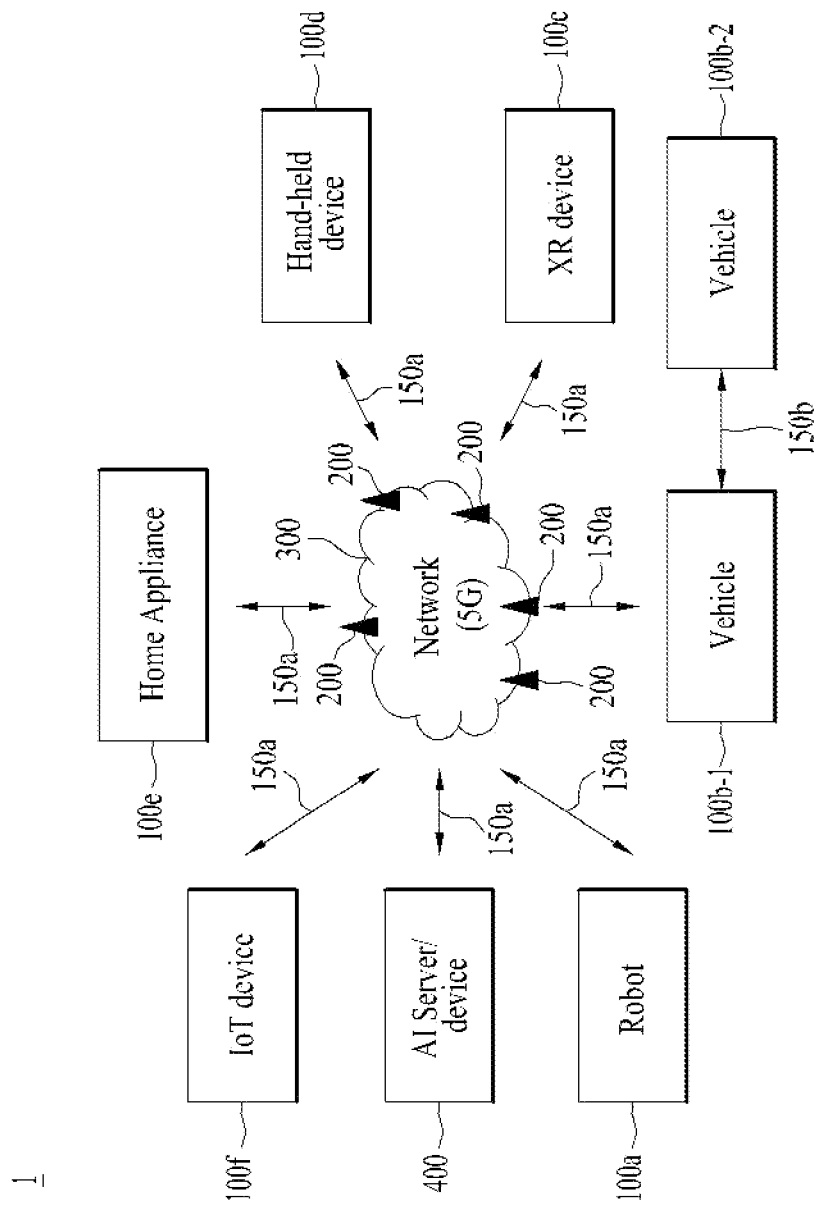
FIG. 1 illustrates an example of a communication system 1 to which implementations of the present disclosure is applied.

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced. For example, the following documents may be referenced.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP NR (e.g. 5G)
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: Overall description 3GPP TS 38.304: User Equipment (UE) procedures in idle mode and in RRC inactive state 3GPP TS 38.321: Medium Access Control (MAC) protocol 3GPP TS 38.322: Radio Link Control (RLC) protocol 3GPP TS 38.323: Packet Data Convergence Protocol (PDCP)

3GPP TS 38.331: Radio Resource Control (RRC) protocol

3GPP TS 37.324: Service Data Adaptation Protocol (SDAP)

3GPP TS 37.340: Multi-connectivity; Overall description

In the present disclosure, a user equipment (UE) may be a fixed or mobile device. Examples of the UE include various devices that transmit and receive user data and/or various kinds of control information to and from a base station (BS). In the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the enhanced packet core (EPC)/long term evolution (LTE) system is referred to as an eNB, and a BS of the new radio (NR) system is referred to as a gNB.

In the present disclosure, a node refers to a point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and an uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In the present disclosure, a physical downlink control channel (PDCCH), and a physical downlink shared channel (PDSCH) refer to a set of time-frequency resources or resource elements (REs) carrying downlink control information (DCI), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. In the present disclosure, for dual connectivity (DC) operation, the term "special Cell" refers to the PCell of the master cell group (MCG) or the PSCell of the secondary cell group (SCG), and otherwise the term Special Cell refers to the PCell. An SpCell supports physical uplink control channel (PUCCH) transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with DC. For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells.

The MCG is a group of serving cells associated with a master BS which terminates at least S1-MME, and the SCG is a group of serving cells associated with a secondary BS that is providing additional radio resources for the UE but is not the master BS. The SCG includes a primary SCell (PSCell) and optionally one or more SCells. In DC, two MAC entities are configured in the UE: one for the MCG and one for the SCG. Each MAC entity is configured by RRC with a serving cell supporting PUCCH transmission and contention based Random Access. In the present disclosure, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present disclosure, monitoring a channel refers to attempting to decode the channel. For example, monitoring a physical downlink control channel (PDCCH) refers to attempting to decode PDCCH(s) (or PDCCH candidates).

In the present disclosure, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, "SPS C-RNTI" refers to a semi-persistent scheduling C-RNTI, and "CS-RNTI" refers to a configured scheduling RNTI.

FIG. 1 illustrates an example of a communication system 1 to which implementations of the present disclosure is applied.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices, base stations (BSs), and a network. Although FIG. 1 illustrates a 5G network as an example of the network of the communication system 1, the implementations of the present disclosure are not limited to the 5G system, and can be applied to the future communication system beyond the 5G system.

The BSs and the network may be implemented as wireless devices and a specific wireless device 200a may operate as a BS/network node with respect to other wireless devices.

The wireless devices represent devices performing communication using radio access technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A user equipment (UE) may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to a fourth industrial revolution field. The unmanned aerial vehicle (UAV) may be, for example, an aircraft aviated by a wireless control signal without a human being onboard. The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet. The public safety device may include, for example, an image relay device or an image device that is wearable on the body of a user. The MTC device and the IoT device may be, for example, devices that do not require direct human intervention or manipulation. For example, the MTC device and the IoT device may include smartmeters, vending machines, thermometers, smartbulbs, door locks, or various sensors. The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure. The security device may be, for example, a device installed to prevent a danger that may arise and to maintain safety. For example, the security device may be a camera, a CCTV, a recorder, or a black box. The FinTech device may be, for example, a device capable of providing a financial service such as mobile payment. For example, the FinTech device may include a payment device or a point of sales (POS) system. The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f/BS 200-BS 200. Herein, the wireless communication/connections may be established through various RATs (e.g., 5G NR) such as uplink/downlink communication 150a and sidelink communication 150b (or D2D communication). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
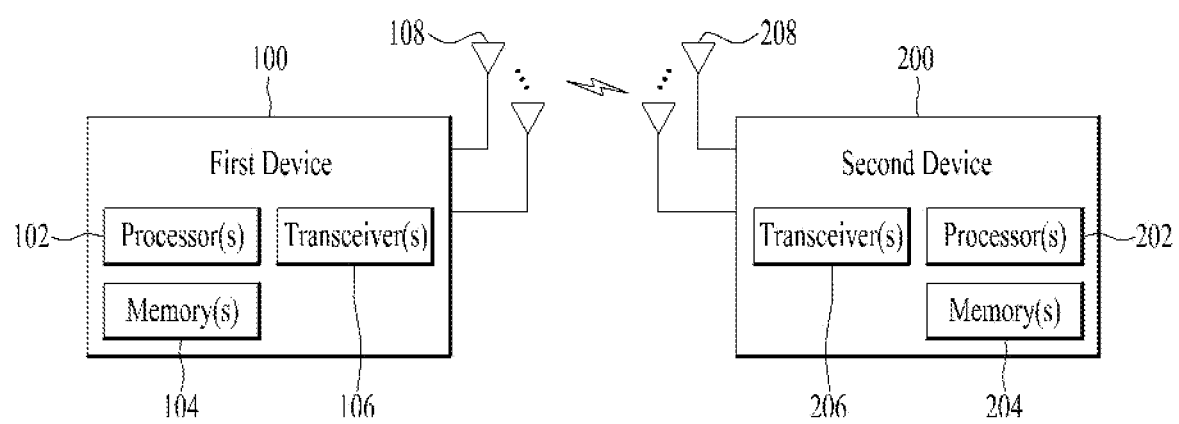
FIG. 2 is a block diagram illustrating examples of communication devices which can perform a method according to the present disclosure.

FIG. 2 is a block diagram illustrating examples of communication devices which can perform a method according to the present disclosure.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to {the wireless device 100a to 100f and the BS 200} and/or {the wireless device 100a to 100f and the wireless device 100a to 100f} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the functions, procedures, and/or methods described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the procedures and/or methods described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the functions, procedures, and/or methods described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the procedures and/or methods described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The functions, procedures, proposals, and/or methods disclosed in the present disclosure may be implemented using firmware or software and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In some implementations of the present disclosure, a UE may operate as a transmitting device in uplink (UL) and as a receiving device in downlink (DL). In some implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS, unless otherwise mentioned or described. For example, the processor(s) 102 connected to, mounted on or launched in the first wireless device 100 may be configured to perform the UE behaviour according to an implementation of the present disclosure or control the transceiver(s) 106 to perform the UE behaviour according to an implementation of the present disclosure. The processor(s) 202 connected to, mounted on or launched in the second wireless device 200 may be configured to perform the BS behaviour according to an implementation of the present disclosure or control the transceiver(s) 206 to perform the BS behaviour according to an implementation of the present disclosure.

Figure 3:
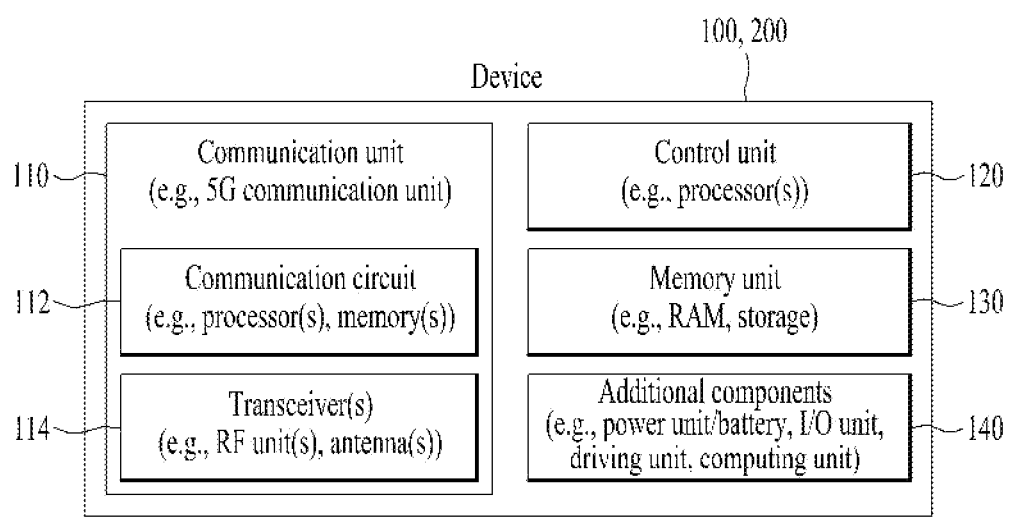
FIG. 3 illustrates another example of a wireless device which can perform implementations of the present invention.

FIG. 3 illustrates another example of a wireless device which can perform implementations of the present invention. The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit (e.g. audio I/O port, video I/O port), a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a Fintech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Figure 4:
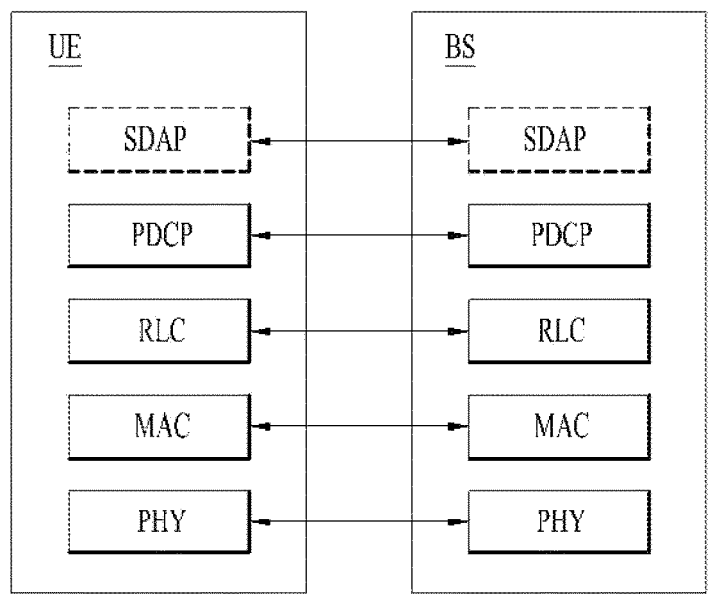
FIG. 4 illustrates an example of protocol stacks in a third generation partnership project (3GPP) based wireless communication system.
Figure 4:
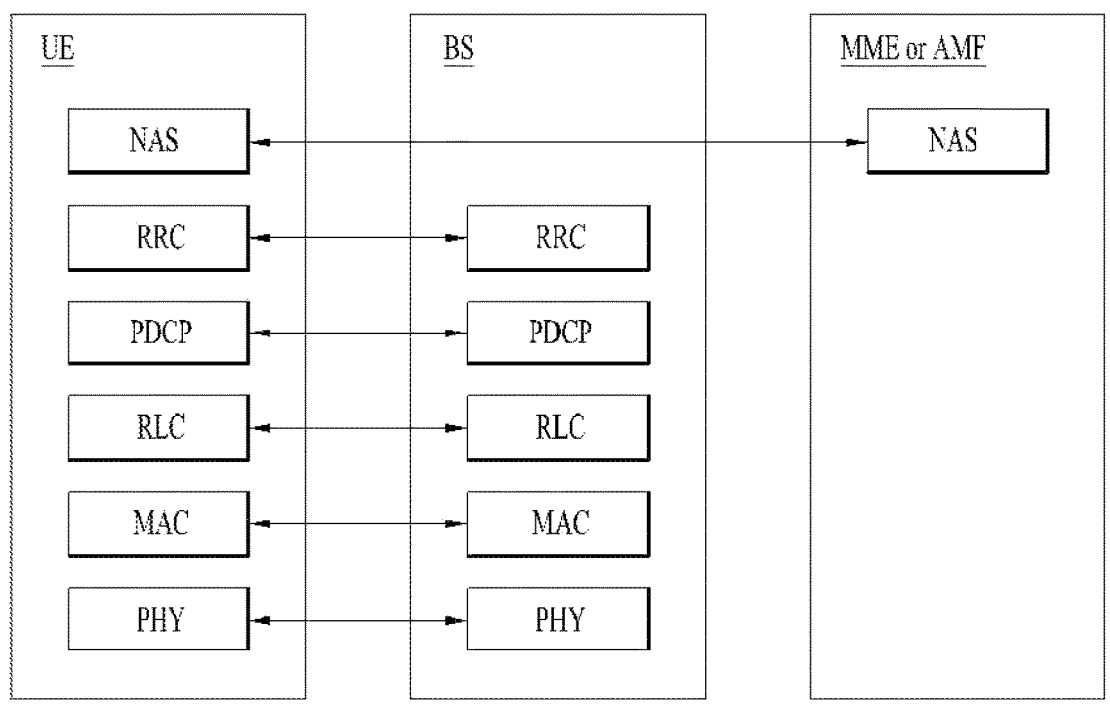

FIG. 4 illustrates an example of protocol stacks in a 3GPP based wireless communication system.

In particular, FIG. 4(a) illustrates an example of a radio interface user plane protocol stack between a UE and a base station (BS) and FIG. 4(b) illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 4(a), the user plane protocol stack may be divided into a first layer (Layer 1) (i.e., a physical (PHY) layer) and a second layer (Layer 2). Referring to FIG. 4(b), the control plane protocol stack may be divided into Layer 1 (i.e., a PHY layer), Layer 2, Layer 3 (e.g., a radio resource control (RRC) layer), and a non-access stratum (NAS) layer. Layer 1, Layer 2 and Layer 3 are referred to as an access stratum (AS).

The NAS control protocol is terminated in an access management function (AMF) on the network side, and performs functions such as authentication, mobility management, security control and etc.

In the 3GPP LTE system, the layer 2 is split into the following sublayers: medium access control (MAC), radio link control (RLC), and packet data convergence protocol (PDCP). In the 3GPP New Radio (NR) system, the layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G Core Network quality of service (QoS) flows.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5G core (5GC) or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer; UE cell selection and reselection and control of cell selection and reselection; Inter-RAT mobility); QoS management functions; UE measurement reporting and control of the reporting; detection of and recovery from radio link failure; NAS message transfer to/from NAS from/to UE.

In the 3GPP NR system, the main services and functions of the PDCP sublayer for the user plane include: sequence numbering; header compression and decompression: ROHC only; transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

The RLC sublayer supports three transmission modes: Transparent Mode (TM); Unacknowledged Mode (UM); and Acknowledged Mode (AM). The RLC configuration is per logical channel with no dependency on numerologies and/or transmission durations. In the 3GPP NR system, the main services and functions of the RLC sublayer depend on the transmission mode and include: Transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use. Different kinds of data transfer services are offered by MAC. To accommodate different kinds of data transfer services, multiple types of logical channels are defined i.e. each supporting transfer of a particular type of information. Each logical channel type is defined by what type of information is transferred. Logical channels are classified into two groups: Control Channels and Traffic Channels. Control channels are used for the transfer of control plane information only, and traffic channels are used for the transfer of user plane information only. Broadcast Control Channel (BCCH) is a downlink logical channel for broadcasting system control information, paging Control Channel (PCCH) is a downlink logical channel that transfers paging information, system information change notifications and indications of ongoing PWS broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In Downlink, the following connections between logical channels and transport channels exist: BCCH can be mapped to BCH; BCCH can be mapped to downlink shared channel (DL-SCH); PCCH can be mapped to PCH; CCCH can be mapped to DL-SCH; DCCH can be mapped to DL-SCH; and DTCH can be mapped to DL-SCH. In Uplink, the following connections between logical channels and transport channels exist: CCCH can be mapped to uplink shared channel (UL-SCH); DCCH can be mapped to UL-SCH; and DTCH can be mapped to UL-SCH.

Figure 5:
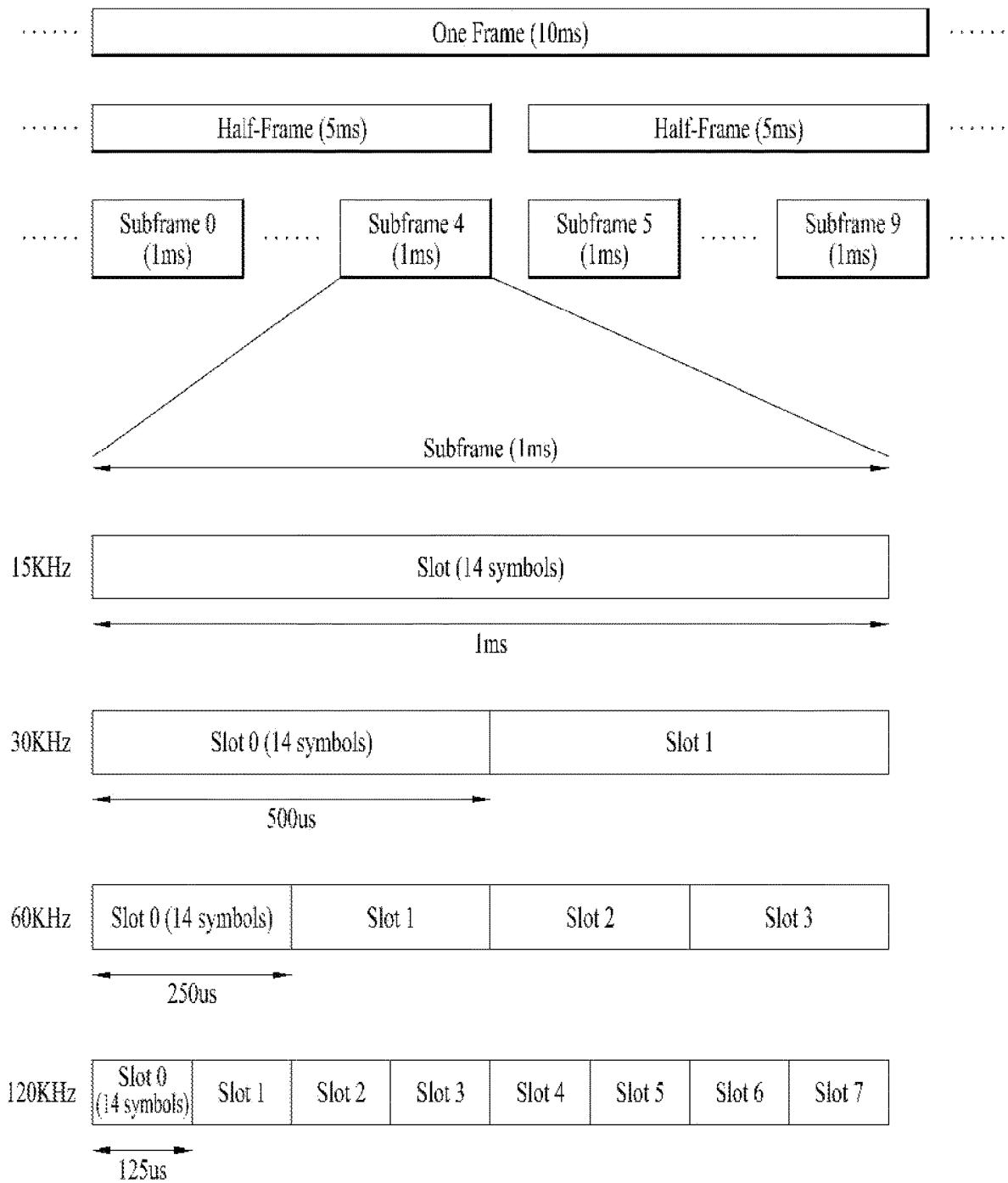
FIG. 5 illustrates an example of a frame structure in a 3GPP based wireless communication system.

FIG. 5 illustrates an example of a frame structure in a 3GPP based wireless communication system.

The frame structure illustrated in FIG. 5 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz. The following table shows the number of OFDM symbols per slot, the number of slots per frame, and the number of slots per for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g. radio resource control (RRC) signaling), where $N^{size,u}_{grid,x}$ is the number of resource blocks in the resource grid and the subscript x is DL for downlink and UL for uplink. $N^{RB}_{sc}$ is the number of subcarriers per resource blocks. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, a resource block is defined by 12 consecutive subcarriers in the frequency domain.

In the 3GPP NR system, resource blocks are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive resource blocks. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

NR frequency bands are defined as 2 types of frequency range, FR1 and FR2. FR2 is may also called millimeter wave (mmW). The frequency ranges in which NR can operate are identified as described in Table 3.

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 6:
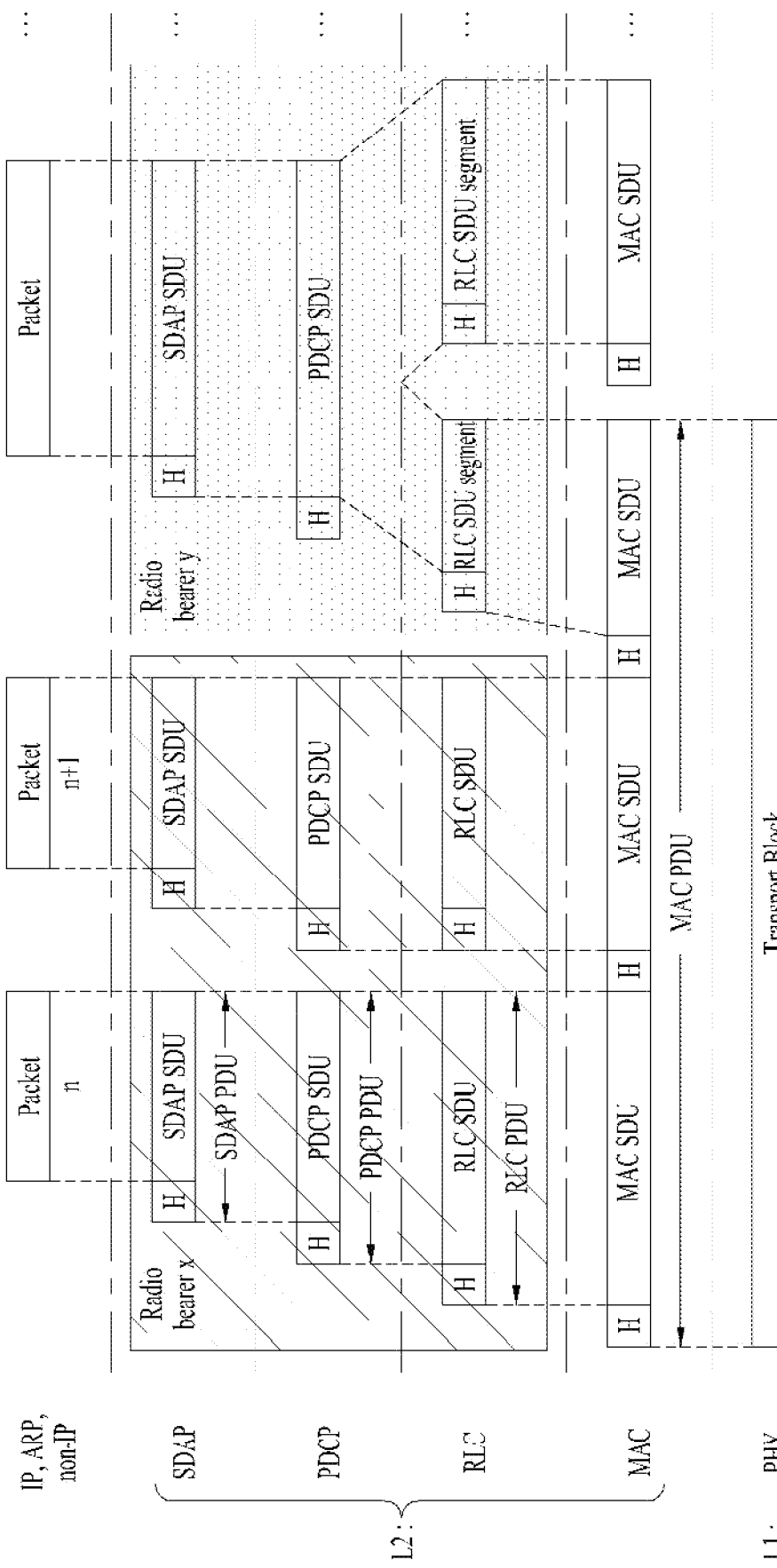
FIG. 6 illustrates a data flow example in the 3GPP new radio (NR) system.

FIG. 6 illustrates a data flow example in the 3GPP NR system. In FIG. 6, "RB" denotes a radio bearer, and "H" denotes a header. Radio bearers are categorized into two groups: data radio bearers (DRB) for user plane data and signaling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to physical uplink shared channel (PUSCH) and physical random access channel (PRACH), respectively, and the downlink transport channels DL-SCH, BCH and PCH are mapped to physical downlink shared channel (PDSCH), physical broad cast channel (PBCH) and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

For UCI transmission/reception, the following PUCCH formats may be used.

TABLE 4

| PUCCH format | Length in OFDM symbols | Number of UCI bits |
|---|---|---|
| 0 | 1-2 | =<2 |
| 1 | 4-14 | =<2 |
| 2 | 1-2 | >2 |
| 3 | 4-14 | >2 |
| 4 | 4-14 | >2 |

PUCCH format 0 is a short PUCCH of 1 or 2 symbols with small UCI payloads of up to two bits. PUCCH format 1 is a long PUCCH of 4 to 14 symbols with small UCI payloads of up to 2 bits. PUCCH format 2 is a short PUCCH of 1 or 2 symbols with large UCI payloads of more than two bits with no UE multiplexing capability in the same PRBs. PUCCH format 3 is a long PUCCH of 4 to 14 symbols with large UCI payloads with no UE multiplexing capability in the same PRBs. PUCCH format 4 is a long PUCCH of 4 to 14 symbols with moderate UCI payloads with multiplexing capacity of up to 4 UEs in the same PRBs. For each PUCCH format, resource location is configured by RRC signalling. For example, IE PUCCH-Config is used to configure UE specific PUCCH parameters (per BWP).

In order to transmit data unit(s) of the present disclosure on UL-SCH, a UE shall have uplink resources available to the UE. In order to receive data unit(s) of the present disclosure on DL-SCH, a UE shall have downlink resources available to the UE. The resource allocation includes time domain resource allocation and frequency domain resource allocation. In the present disclosure, uplink resource allocation is also referred to as uplink grant, and downlink resource allocation is also referred to as downlink assignment. An uplink grant is either received by the UE dynamically on PDCCH, in a Random Access Response, or configured to the UE semi-persistently by RRC. Downlink assignment is either received by the UE dynamically on the PDCCH, or configured to the UE semi-persistently by RRC signaling from the BS.

In UL, the BS can dynamically allocate resources to UEs via the Cell Radio Network Temporary Identifier (C-RNTI) on PDCCH(s). A UE always monitors the PDCCH(s) in order to find possible grants for uplink transmission when its downlink reception is enabled (activity governed by discontinuous reception (DRX) when configured). In addition, with Configured Grants, the BS can allocate uplink resources for the initial HARQ transmissions to UEs. Two types of configured uplink grants are defined: Type 1 and Type 2. With Type 1, RRC directly provides the configured uplink grant (including the periodicity). With Type 2, RRC defines the periodicity of the configured uplink grant while PDCCH addressed to Configured Scheduling RNTI (CS-RNTI) can either signal and activate the configured uplink grant, or deactivate it; i.e. a PDCCH addressed to CS-RNTI indicates that the uplink grant can be implicitly reused according to the periodicity defined by RRC, until deactivated.

In DL, the BS can dynamically allocate resources to UEs via the C-RNTI on PDCCH(s). A UE always monitors the PDCCH(s) in order to find possible assignments when its downlink reception is enabled (activity governed by DRX when configured). In addition, with Semi-Persistent Scheduling (SPS), the BS can allocate downlink resources for the initial HARQ transmissions to UEs: RRC defines the periodicity of the configured downlink assignments while PDCCH addressed to CS-RNTI can either signal and activate the configured downlink assignment, or deactivate it. In other words, a PDCCH addressed to CS-RNTI indicates that the downlink assignment can be implicitly reused according to the periodicity defined by RRC, until deactivated.

Resource Allocation by PDCCH (i.e. Resource Allocation by DCI)

PDCCH can be used to schedule DL transmissions on PDSCH and UL transmissions on PUSCH, where the downlink control information (DCI) on PDCCH includes: downlink assignments containing at least modulation and coding format (e.g., modulation and coding scheme (MCS) index $I_{MCS}$), resource allocation, and hybrid-ARQ information related to DL-SCH; or uplink scheduling grants containing at least modulation and coding format, resource allocation, and hybrid-ARQ information related to UL-SCH. The size and usage of the DCI carried by one PDCCH are varied depending on DCI formats. For example, in the 3GPP NR system, DCI format 0_0 or DCI format 0_1 is used for scheduling of PUSCH in one cell, and DCI format 1_0 or DCI format 1_1 is used for scheduling of PDSCH in one cell.

Figure 7:
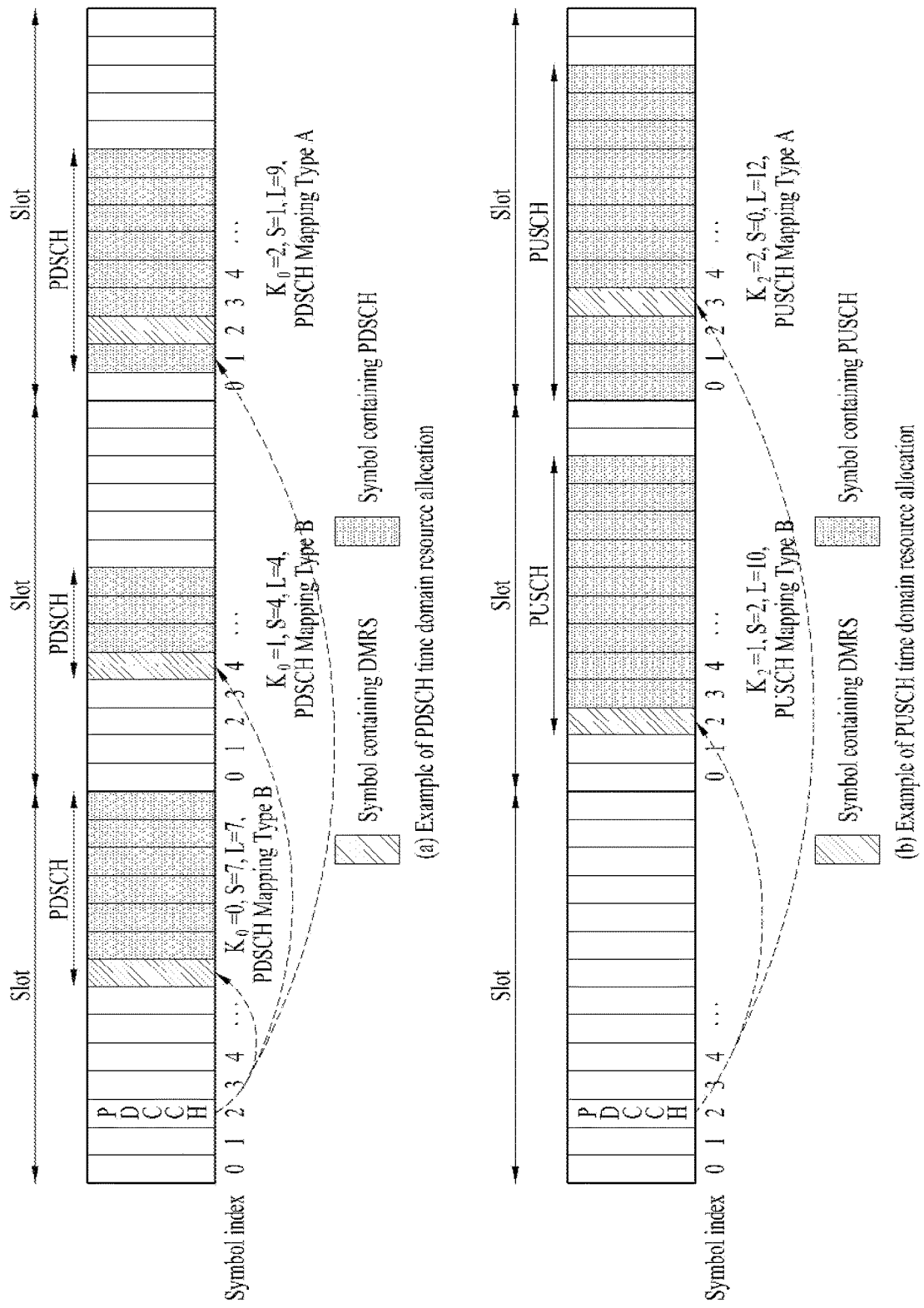
FIG. 7 illustrates an example of physical downlink shared channel (PDSCH) time domain resource allocation by physical downlink control channel (PDCCH), and an example of physical uplink shared channel (PUSCH) time resource allocation by PDCCH.

FIG. 7 illustrates an example of PDSCH time domain resource allocation by PDCCH, and an example of PUSCH time resource allocation by PDCCH.

Downlink control information (DCI) carried by a PDCCH for scheduling PDSCH or PUSCH includes a value m for a row index m+1 to an allocation table for PDSCH or PUSCH. Either a predefined default PDSCH time domain allocation A, B or C is applied as the allocation table for PDSCH, or RRC configured pdsch-TimeDomainAllocationList is applied as the allocation table for PDSCH. Either a predefined default PUSCH time domain allocation A is applied as the allocation table for PUSCH, or the RRC configured pusch-TimeDomainAllocationList is applied as the allocation table for PUSCH. Which PDSCH time domain resource allocation configuration to apply and which PUSCH time domain resource allocation table to apply are determined according to a fixed/predefined rule (e.g. Table 5.1.2.1.1-1 in 3GPP TS 38.214 v15.3.0, Table 6.1.2.1.1-1 in 3GPP TS 38.214 v15.3.0).

Each indexed row in PDSCH time domain allocation configurations defines the slot offset $K_0$, the start and length indicator SLIV, or directly the start symbol S and the allocation length L, and the PDSCH mapping type to be assumed in the PDSCH reception. Each indexed row in PUSCH time domain allocation configurations defines the slot offset $K_2$, the start and length indicator SLIV, or directly the start symbol S and the allocation length L, and the PUSCH mapping type to be assumed in the PUSCH reception. $K_0$ for PDSCH, or $K_2$ for PUSCH is the timing difference between a slot with a PDCCH and a slot with PDSCH or PUSCH corresponding to the PDCCH. SLIV is a joint indication of starting symbol S relative to the start of the slot with PDSCH or PUSCH, and the number L of consecutive symbols counting from the symbol S. For PDSCH/PUSCH mapping type, there are two mapping types: one is Mapping Type A where demodulation reference signal (DMRS) is positioned in $3^{rd}$ or $4^{th}$ symbol of a slot depending on the RRC signaling, and other one is Mapping Type B where DMRS is positioned in the first allocated symbol.

The scheduling DCI includes the Frequency domain resource assignment field which provides assignment information on resource blocks used for PDSCH or PUSCH. For example, the Frequency domain resource assignment field may provide a UE with information on a cell for PDSCH or PUSCH transmission, information on a bandwidth part for PDSCH or PUSCH transmission, information on resource blocks for PDSCH or PUSCH transmission.

Resource Allocation by RRC

As mentioned above, in uplink, there are two types of transmission without dynamic grant: configured grant Type 1 where an uplink grant is provided by RRC, and stored as configured grant; and configured grant Type 2 where an uplink grant is provided by PDCCH, and stored or cleared as configured uplink grant based on L1 signaling indicating configured uplink grant activation or deactivation. Type 1 and Type 2 are configured by RRC per serving cell and per BWP. Multiple configurations can be active simultaneously only on different serving cells. For Type 2, activation and deactivation are independent among the serving cells. For the same serving cell, the MAC entity is configured with either Type 1 or Type 2.

A UE is provided with at least the following parameters via RRC signaling from a BS when the configured grant type 1 is configured:
  cs-RNTI which is CS-RNTI for retransmission;
  periodicity which provides periodicity of the configured grant Type 1;
  timeDomainOffset which represents offset of a resource with respect to SFN=0 in time domain;
  timeDomainAllocation value m which provides a row index m+1 pointing to an allocation table, indicating a combination of a start symbol S and length L and PUSCH mapping type;
  frequencyDomainAllocation which provides frequency domain resource allocation; and
  mcsAndTBS which provides $I_{MCS}$ representing the modulation order, target code rate and transport block size. Upon configuration of a configured grant Type 1 for a serving cell by RRC, the UE stores the uplink grant provided by RRC as a configured uplink grant for the indicated serving cell, and initialise or re-initialise the configured uplink grant to start in the symbol according to timeDomainOffset and S (derived from SLIV), and to reoccur with periodicity. After an uplink grant is configured for a configured grant Type 1, the UE considers that the uplink grant recurs associated with each symbol for which: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0.

A UE is provided with at least the following parameters via RRC signaling from a BS when the configured gran Type 2 is configured:
  cs-RNTI which is CS-RNTI for activation, deactivation, and retransmission; and
  periodicity which provides periodicity of the configured grant Type 2. The actual uplink grant is provided to the UE by the PDCCH (addressed to CS-RNTI). After an uplink grant is configured for a configured grant Type 2, the UE considers that the uplink grant recurs associated with each symbol for which: [(SFN*numberOfSlotsPerFrame*numberOfSymbolsPerSlot)+(slot number in the frame*numberOfSymbolsPerSlot)+symbol number in the slot]=[(SFN$_{start\ time}$*numberOfSlotsPerFrame*numberOfSymbolsPerSlot+ slot$_{start\ time}$*numberOfSymbolsPerSlot+ symbol$_{start\ time}$)+N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ are the SFN, slot, and symbol, respectively, of the first transmission opportunity of PUSCH where the configured uplink grant was (re-)initialised. numberOfSlotsPerFrame and numberOfSymbolsPerSlot refer to the number of consecutive slots per frame and the number of consecutive OFDM symbols per slot, respectively (see Table 1 and Table 2).

For configured uplink grants, the HARQ Process ID associated with the first symbol of a UL transmission is derived from the following equation:

HARQ Process ID=[floor(CURRENT_symbol/periodicity)]modulo nrofHARQ-Processes where CURRENT_symbol=(SFN numberOfSlotsPerFrame×numberOfSymbolsPerSlot+slot number in the frame*numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211. CURRENT_symbol refers to the symbol index of the first transmission occasion of a repetition bundle that takes place. A HARQ process is configured for a configured uplink grant if the configured uplink grant is activated and the associated HARQ process ID is less than nrofHARQ-Processes.

For downlink, a UE may be configured with semi-persistent scheduling (SPS) per serving cell and per BWP by RRC signaling from a BS. Multiple configurations can be active simultaneously only on different serving cells. Activation and deactivation of the DL SPS are independent among the serving cells. For DL SPS, a DL assignment is provided to the UE by PDCCH, and stored or cleared based on L1 signaling indicating SPS activation or deactivation. A UE is provided with the following parameters via RRC signaling from a BS when SPS is configured:

cs-RNTI which is CS-RNTI for activation, deactivation, and retransmission;

nrofHARQ-Processes: which provides the number of configured HARQ processes for SPS;

periodicity which provides periodicity of configured downlink assignment for SPS. When SPS is released by upper layers, all the corresponding configurations shall be released.

After a downlink assignment is configured for SPS, the UE considers sequentially that the $N^{th}$ downlink assignment occurs in the slot for which: (numberOfSlotsPerFrame*SFN+slot number in the frame)= [(numberOfSlotsPerFrame*SFN$_{start\ time}$+slot$_{start\ time}$) N*periodicity*numberOfSlotsPerFrame/10] modulo (1024*numberOfSlotsPerFrame), where SFN$_{start\ time}$ and slot$_{start\ time}$ are the SFN and slot, respectively, of the first transmission of PDSCH where the configured downlink assignment was (re-)initialised.

For configured downlink assignments, the HARQ Process ID associated with the slot where the DL transmission starts is derived from the following equation:

HARQ Process ID=[floor(CURRENT_slot*10/
(numberOfSlotsPerFrame*periodicity))]modulo
nrofHARQ-Processes where CURRENT_slot= [(SFN*numberOfSlotsPerFrame)+slot number in the frame] and numberOfSlotsPerFrame refers to the number of consecutive slots per frame as specified in TS 38.211.

A UE validates, for scheduling activation or scheduling release, a DL SPS assignment PDCCH or configured UL grant type 2 PDCCH if the cyclic redundancy check (CRC) of a corresponding DCI format is scrambled with CS-RNTI provided by the RRC parameter cs-RNTI and the new data indicator field for the enabled transport block is set to 0. Validation of the DCI format is achieved if all fields for the DCI format are set according to Table 5 or Table 6. Table 5 shows special fields for DL SPS and UL grant Type 2 scheduling activation PDCCH validation, and Table 6 shows special fields for DL SPS and UL grant Type 2 scheduling release PDCCH validation.

TABLE 5

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

TABLE 6

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and actual UL grant, and the corresponding modulation and coding scheme are provided by the resource assignment fields (e.g. time domain resource assignment field which provides Time domain resource assignment value m, frequency domain resource assignment field which provides the frequency resource block allocation, modulation and coding scheme field) in the DCI format carried by the DL SPS and UL grant Type 2 scheduling activation PDCCH. If validation is achieved, the UE considers the information in the DCI format as valid activation or valid release of DL SPS or configured UL grant Type 2.

The network may configure an RRC_CONNECTED UE to perform measurements and report them in accordance with the measurement configuration. The measurement configuration is provided by means of dedicated signaling. The network may configure the UE to perform the following types of measurements: i) NR measurements and ii) inter-RAT measurements of E-UTRA frequencies. The network may configure the UE to report the following measurement information based on synchronization signal/PBCH (SS/PBCH) block(s): i) Measurement results per SS/PBCH block; measurement results per cell based on SS/PBCH block(s); SS/PBCH block(s) indexes. The network may configure the UE to report the following measurement information based on channel state information reference signal (CSI-RS) resources: measurement results per CSI-RS resource; measurement results per cell based on CSI-RS resource(s); CSI-RS resource measurement identifiers.

The measurement configuration includes the following parameters:

Measurement objects (MO): A list of objects on which the UE shall perform the measurements. For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting. The measObjectIdof the MO which corresponds to each serving cell is indicated by servingCellMO within the serving cell configuration. For inter-RAT E-UTRA measurements a measurement object is a single EUTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

Reporting configurations: A list of reporting configurations where there can be one or multiple reporting configurations per measurement object. Each reporting configuration consists of the following: i) reporting criterion, ii) reference signal (S) type, and iii) reporting format. The reporting criterion is the criterion that triggers the UE to send a measurement report. This can either be periodical or a single event description. The RS type is the RS that the UE uses for beam and cell measurement results (SS/PBCH block or CSI-RS). The reporting format is the quantities per cell and per beam that the UE includes in the measurement report (e.g. RSRP) and other associated information such as the maximum number of cells and the maximum number beams per cell to report.

Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

Measurement gaps: Periods that the UE may use to perform measurements, i.e. no (UL, DL) transmissions are scheduled.

A UE in RRC_CONNECTED maintains a measurement object list, a reporting configuration list, and a measurement identities list according to signaling and procedures in this specification. The measurement object list possibly includes NR measurement object(s) and inter-RAT objects. Similarly, the reporting configuration list includes NR and inter-RAT reporting configurations. Any measurement object can be linked to any reporting configuration of the same RAT type. An RRC_CONNECTED UE shall derive cell measurement results by measuring one or multiple beams associated per cell as configured by the network. For cell measurements, the network can configure reference signal received power (RSRP), reference signal received quality (RSRQ) or signal-to-noise and interference ratio (SINR) as trigger quantity. Reporting quantities can be the same as trigger quantity or combinations of quantities (i.e. RSRP and RSRQ; RSRP and SINR; RSRQ and SINR; RSRP, RSRQ and SINR).

The measurement procedures distinguish the following types of cells:
The NR serving cell(s): these are the SpCell and one or more SCells.
Listed cells: these are cells listed within the measurement object(s).
Detected cells: these are cells that are not listed within the measurement object(s) but are detected by the UE on the SSB frequency(ies) and subcarrier spacing(s) indicated by the measurement object(s).

For NR measurement object(s), the UE measures and reports on the serving cell(s), listed cells and/or detected cells. For inter-RAT measurements object(s) of E-UTRA, the UE measures and reports on listed cells and detected cells.

Intra-frequency neighbour (cell) measurements and inter-frequency neighbour (cell) measurements are defined as follows:
SS/PBCH block (SSB) based intra-frequency measurement: a measurement is defined as an SSB based intra-frequency measurement provided the center frequency of the SSB of the serving cell and the center frequency of the SSB of the neighbour cell are the same, and the subcarrier spacing of the two SSBs is also the same.
SSB based inter-frequency measurement: a measurement is defined as an SSB based inter-frequency measurement provided the center frequency of the SSB of the serving cell and the center frequency of the SSB of the neighbour cell are different, or the subcarrier spacing of the two SSBs is different.
CSI-RS based intra-frequency measurement: a measurement is defined as a CSI-RS based intra-frequency measurement provided the bandwidth of the CSI-RS resource on the neighbour cell configured for measurement is within the bandwidth of the CSI-RS resource on the serving cell configured for measurement, and the subcarrier spacing of the two CSI-RS resources is the same.
CSI-RS based inter-frequency measurement: a measurement is defined as a CSI-RS based inter-frequency measurement provided the bandwidth of the CSI-RS resource on the neighbour cell configured for measurement is not within the bandwidth of the CSI-RS resource on the serving cell configured for measurement, or the subcarrier spacing of the two CSI-RS resources is different.

Whether a measurement is non-gap-assisted or gap-assisted depends on the capability of the UE, the active BWP of the UE and the current operating frequency. In non-gap-assisted scenarios, the UE shall be able to carry out such measurements without measurement gaps. In gap-assisted scenarios, the UE cannot be assumed to be able to carry out such measurements without measurement gaps.

The network may provide a UE with MeasGapConfig that specifies the measurement gap configuration and controls setup/release of measurement gaps. The measurement gap configuration includes the following parameters:
gapOffset: the gap offset of the gap pattern with measurement gap repetition period (MGRP) indicated in the field mgrp. The value range should be from 0 to mgrp−1.
mgl; the measurement gap length in ms of the measurement gap. Value ms1dot5 corresponds to 1.5 ms, ms3 corresponds to 3 ms and so on.
mgrp: measurement gap repetition period in (ms) of the measurement gap.
mgta: the measurement gap timing advance in ms. Value ms0 corresponds to 0 ms, ms0dot25 corresponds to 0.25 ms and ms0dot5 corresponds to 0.5 ms.

With the measurement configuration, if a UE requires measurement gaps to identify and measure intra-frequency cells and/or inter-frequency cells and/or inter-RAT E-UTRAN cells, the network configures the measurement gaps for the UE based on the UE capability and current operating/target frequency.

If the UE requires measurement gaps to identify and measure intra-frequency cells and/or inter-frequency cells and/or inter-RAT E-UTRAN cells, and the UE does not support independent measurement gap patterns for different frequency ranges, the network provides a single per-UE measurement gap pattern for concurrent monitoring of all frequency layers. If the UE requires measurement gaps to identify and measure intra-frequency cells and/or inter-frequency cells and/or inter-RAT E-UTRAN cells, and the UE supports independent measurement gap patterns for different frequency ranges, the network provides either per-FR measurement gap patterns for frequency range where UE requires per-FR measurement gap for concurrent monitoring of all frequency layers of each frequency range independently, or a single per-UE measurement gap pattern for concurrent monitoring of all frequency layers of all frequency ranges.

During the per-UE measurement gaps, the UE is not required to conduct reception/transmission from/to the corresponding E-UTRAN PCell, E-UTRAN SCell(s) and NR serving cells for non-standalone (NSA) except the reception of signals used for RRM measurement, and not required to conduct reception/transmission from/to the corresponding NR serving cells for standalone (SA) except the reception of signals used for RRM measurement.

During the per-FR measurement gaps, the UE is not required to conduct reception/transmission from/to the corresponding E-UTRAN PCell, E-UTRAN SCell(s) and NR serving cells in the corresponding frequency range for NSA except the reception of signals used for radio resource management (RRM) measurement, and not required to conduct reception/transmission from/to the corresponding NR serving cells in the corresponding frequency range for SA except the reception of signals used for RRM measurement.

UEs shall support the measurement gap patterns (e.g. listed in Table 7) based on the applicability (e.g., specified in Table 8). UE determines measurement gap timing based on gap offset configuration and measurement gap timing advance configuration provided by higher layer signaling (e.g. RRC signaling). Table 7 shows an example of Gap Pattern Configurations, and Table 8 shows an example

TABLE 7

| Gap Pattern Id | Measurement Gap Length (MGL, ms) | Measurement Gap Repetition Period (MGRP, ms) |
| --- | --- | --- |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |

TABLE 7-continued

| Gap Pattern Id | Measurement Gap Length (MGL, ms) | Measurement Gap Repetition Period (MGRP, ms) |
| --- | --- | --- |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

TABLE 8

| Measurement gap pattern configuration | Serving cell | Measurement Purpose | Applicable Gap Pattern Id |
| --- | --- | --- | --- |
| Per-UE measurement gap | E-UTRA + FR1, or E-UTRA + FR2, or E-UTRA + FR1 + FR2 | non-NR RAT FR1 and/or FR2 non-NR RAT and FR1 and/or FR2 | 0,1,2,3 0-11 0,1,2,3 |
| Per FR measurement gap | E-UTRA and, FR1 if configured FR2 if configured | non-NR RAT | 0,1,2,3 No gap |
|  | E-UTRA and, FR1 if configured FR2 if configured | FR1 only | 0-11 No gap |
|  | E-UTRA and, FR1 if configured FR2 if configured | FR2 only | No gap 12-23 |
|  | E-UTRA and, FR1 if configured FR2 if configured | non-NR RAT and FR1 | 0,1,2,3 No gap |
|  | E-UTRA and, FR1 if configured FR2 if configured | FR1 and FR2 | 0-11 12-23 |
|  | E-UTRA and, FR1 if configured FR2 if configured | non-NR RAT and FR2 | 0,1,2,3 12-23 |
|  | E-UTRA and, FR1 if configured FR2 if configured | non-NR RAT and FR1 and FR2 | 0,1,2,3 12-23 |

In Table 8, non-NR RAT includes E-UTRA, UTRA and/or GSM. In gap-assisted scenarios, it cannot be assumed that the UE is able to carry out such measurements without measurement gaps.

In the existing MAC standards (e.g., 3GPP TS 38.321 V15.3.0), if the network configures the measurement gaps for a UE, the UE shall not perform the followings during a measurement gap:

transmitting HARQ feedback, scheduling request (SR), and/or CSI;
reporting sounding reference signal (SRS);
transmitting UL data on UL-SCH; and/or
monitoring the PDCCH.

But, during the measurement gap, transmission/reception of random access channel (RACH) related messages (e.g. random access preamble (Msg1), random access response (Msg2), UL-SCH (Msg3) based on a UL grant included in the random access response), contention resolution message (Msg4)) is not prohibited. That is, the UE shall monitor the PDCCH while the random access response (RAR) window or random access (RA) Contention Resolution timer (e.g. ra-ContentionResolutionTimer) is running, and transmit Msg3, even during a measurement gap.

In NR, the length of measurement gap could be from 1.5 ms to 6 ms depending on the frequency of the serving and target cell, whereas for URLLC traffic, the target for user plane latency is 0.5 ms for UL, and 0.5 ms for DL. Even if the measurement gap is set to 1.5 ms in case of per frequency range (per-FR) measurement, the QoS requirements for URLLC traffic may not be met. Especially, if URLLC traffic has a sporadic pattern, the network cannot predict when the URLLC data will be generated. In this case, the measurement gap may be an obstacle to the successful transmission of URLLC data. Methods for solving these problems are required.

In order to successfully transmit/receive data of a UE having a possibility of movement, the network may configure the measurement gap to the UE to identify and measure intra-frequency cells and/or inter-frequency cells and/or inter-RAT E-UTRAN cells. But, if a logical channel for URLLC traffics and/or data radio bearer for URLLC traffics is configured to the UE, and if the URLLC service has very stringent quality of service (QoS) requirements (e.g., 0.5 ms user plane latency), the measurement gap can lead to failure of URLLC data transmission/reception.

In some implementations of the present disclosure, a UE transmits UL data or scheduling request (SR), or receives UL grant, DL assignment, or DL data during the associated measurement gap by indicating the measurement gap skip to the network, whereby the requirement of the URLLC service may be satisfied.

Figure 8:
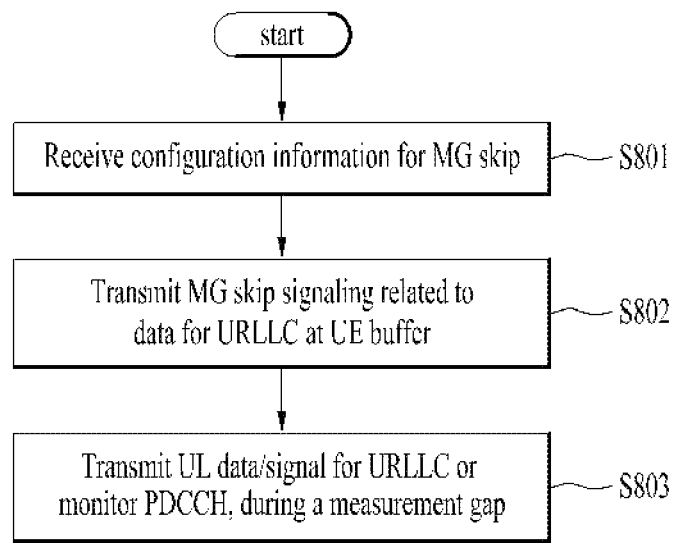
FIG. 8 illustrates an example of a measurement gap (MG) skip procedure according to some implementations of the present disclosure.

FIG. 8 illustrates an example of a measurement gap (MG) skip procedure according to some implementations of the present disclosure.

Referring to FIG. 8, the UE may receive configuration information related to the MG skip (S801). For example, the UE may receive an RRC message including configuration information regarding the MG skip.

The UE may configure UL resources for the MG skip based on the configuration information. In some scenarios, the resource for the MG skip may be configured with the same period as the measurement gap configured for the UE. For example, the UE may configure UL resources for measurement gap skip having the same period as the measurement gap of the UE.

The UE may trigger the MG skip when URLLC data arrives at the UE buffer. A UE transmits a measurement gap (MG) skip signaling (S802), if the UE buffer for the URLLC data (e.g., RLC buffer of a logical channel for URLLC, and/or HARQ buffer including the logical channel for URLLC) is not empty at the time point when the available resource for the MG skip is present. The logical channel for URLLC may be identified by a specific logical channel ID, a specific data radio bearer ID associated with the logical channel, and/or a QoS value/level related to the logical channel or radio bearer.

If the MG skip signaling has been transmitted, the UE may perform the followings (S803) during the measurement gap associated with the transmitted MG skip signaling:
  transmitting HARQ feedback, scheduling request (SR), and/or channel state information (CSI);
  reporting sounding reference signal (SRS);
  transmitting UL data on UL-SCH; and/or
  monitoring the PDCCH.

If the MG skip signaling has been transmitted, UL data of the UE may be transmitted on a configured grant (CG) in the measurement gap associated with the MG skip signaling.

For example, the UE may transmit UL data/signal for URLLC or monitor PDCCH during the measurement gap associated with the transmitted measurement gap (MG) skip signaling.

Alternatively or additionally, if the MG skip signaling has been transmitted, the UE may not or does not perform the measurement during the measurement gap associated with the transmitted MG skip signaling.

A UE in some implementations of the present disclosure receives configuration information for measurement gap (MG) skip (S801). The UE may receive a RRC message including the configuration information for the MG skip. The configuration information may include periodic resource information for the MG skip signaling. Each MG skip resource is associated with a measurement gap of the UE. In some scenarios, it may be preferable that the resource for the MG skip is configured with the same period as the measurement gap configured for the UE. The UE may be configured with a logical channel or a data radio bearer for URLLC traffics, and the URLLC may have a characteristic of a sporadic/small data.

Figure 9:
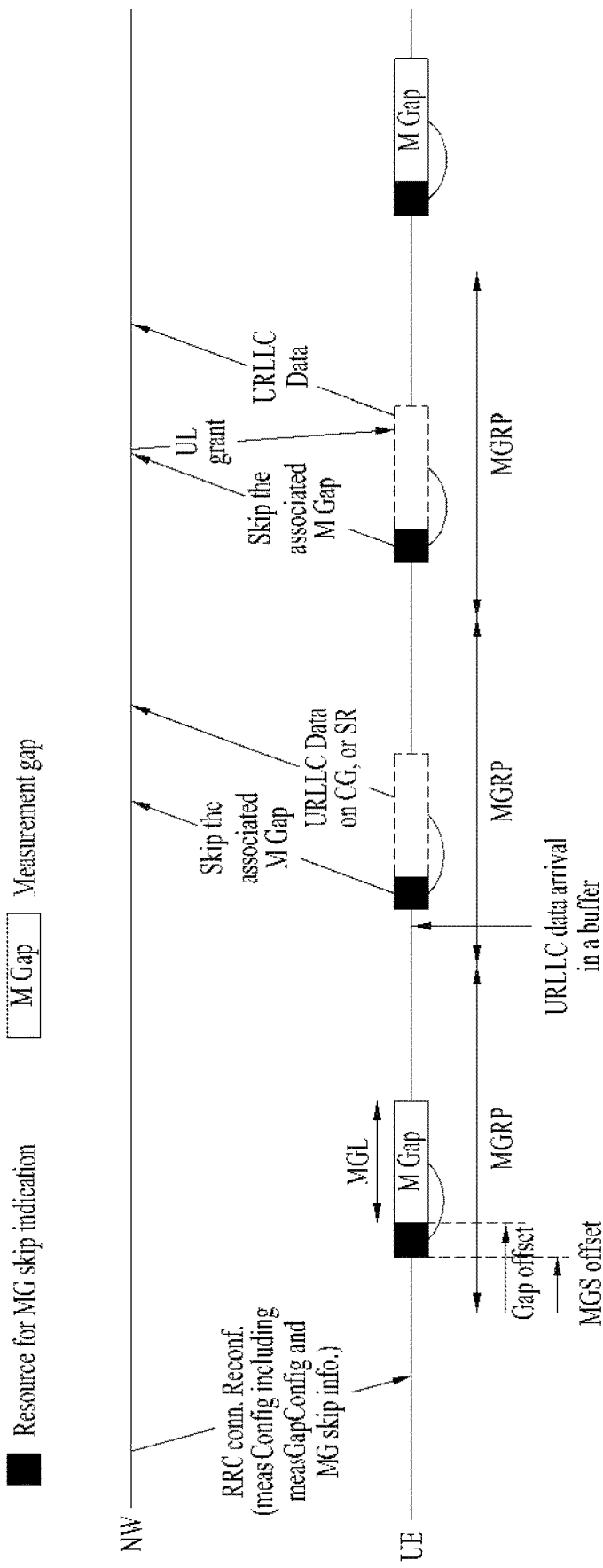
FIG. 9 illustrates an example of the network (NW) and UE behavior when measurement gap (MG) skip signaling is applied on UL.

FIG. 9 illustrates an example of the network (NW) and UE behavior when measurement gap (MG) skip signaling is applied on UL.

In the example of FIG. 9, the configuration information for the MG skip may be transmitted via the RRC connection reconfiguration message including the measurement gap configuration. The resources for the MG skip signaling may be periodically allocated on the physical channel (e.g. PUCCH), and the period of the resource may be configured with the same period, i.e., MGRP (Measurement Gap Repetition Period), as the measurement gap configured for the UE. The resource for the MG skip signaling can be located before the associated measurement gap. That is, the network may configure the offset for the MG skip signaling (MGS offset), wherein the value range of the MGS offset may be from −1 to 'gapOffset−1' (ms/slot/symbol/SubFrame/RadioFrame), i.e., the time point right before the associated measurement gap, as shown in FIG. 9. If the MG skip signaling is not transmitted by a UE, the UE shall perform the measurement during the measurement gap (M Gap)

Figure 10:
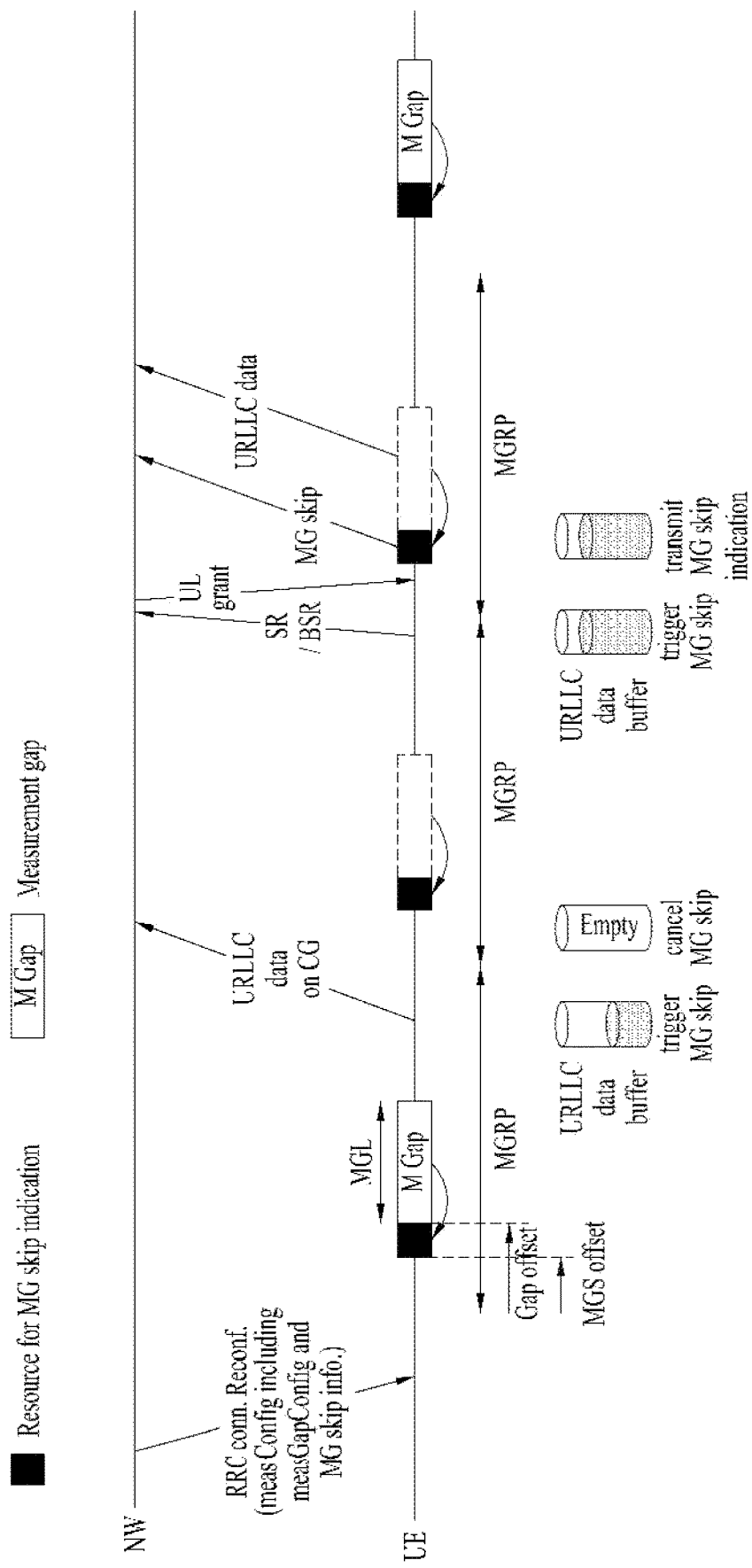
FIG. 10 illustrates another example of the NW and UE behaviour when the MG skip signaling is applied on UL.

FIG. 10 illustrates another example of the NW and UE behaviour when the MG skip signaling is applied on UL.

Referring to FIG. 10, if the MG skip signaling has been triggered by the URLLC data, but the whole URLLC data in the buffer has been successfully transmitted (i.e., if the buffer for URLLC data of UE becomes empty) before the UE has a transmission occasion on the valid physical resource for the MG skip, the UE may cancel the triggered MG skip signaling.

A scheduling request (SR) configuration may be provided to a UE by the network for a logical channel. The SR configuration is used to configure the parameters for the dedicated SR resources. The SR resources are physical layer resources on PUCCH where the UE may send the dedicated SR.

In some implementations of the present disclosure, if the MG skip signaling is triggered by a logical channel but an SR for the logical channel has not yet been transmitted by a UE, the network receiving the MG skip signaling can handle it as if it received the SR for the corresponding logical channel. That is, via the MG skip signaling reception, the network can distinguish that the UE requires a UL resource for the logical channel associated with the MG skip, as well as skips the measurement gap. If so, the UE may cancel the pending SR for the logical channel when the MG skip signaling is transmitted. In some implementations of the present disclosure, an SR transmitted on a SR resource of a specific logical channel (e.g. logical channel for URLLC traffics) may act as the MG skip signaling. For example, the network may determine that the UE will skip measurements on a measurement gap associated with the SR resource (e.g. a measurement gap following the SR resource, or a measurement gap occurring within a predefined/preconfigured period after the SR resource) when the network receives an SR on the SR resource.

Referring to FIG. 10, a UE receives a RRC message including information related to the measurement configuration from a BS. The information related to the measurement configuration may include a measurement gap configuration. The measurement gap configuration may include the following parameters:

Measurement Gap Repetition Period (MGRP);
Measurement Gap Length;
Gap Offset;
Measurement gap skip configuration.

The measurement gap skip configuration may include the following parameters:

Resource information for the MG skip signaling; and
Logical channel ID(s) for which the MG skip is applied.

The resource information for the MG skip signaling may include the following parameters:

PUCCH resource ID: e.g., ID of a PUCCH resource on which the UE shall send the MG skip signaling. The actual PUCCH-Resource is configured by the higher layer (e.g. RRC) signaling PUCCH-Config of the same UL BWP and serving cell as this configuration. The network may configure a PUCCH-Resource of PUCCH-format0 or PUCCH-format1 (other formats not supported).

MG skip Offset: the value range may be from −1 to 'GapOffset−1', if Gap Offset range is from 0 to 'MGRP−1'.

MG skip signaling Period: the value may be same as the MGRP or MGRP-based.

The UE configures the PUCCH resources for MG skip associated with the measurement gaps based on the received RRC message. If the UE has new UL data available for the logical channel indicated in the MG skip configuration, the UE may trigger the MG skip procedure. If all data for the logical channel which had triggered the MG skip procedure are transmitted, the UE may cancel the MG skip procedure. When the UE has a MG skip signaling occasion on the valid PUCCH resource for the MG skip, the UE transmits the MG skip signaling (i.e., the MAC entity instructs the physical layer to signal the MG skip signaling on one valid PUCCH resource for MG skip). If the UE has transmitted the MG skip signaling, the UE may perform to transmit UL data/signal (e.g., the UE may transmit a UL data on the configured grant (CG) resource that overlaps with the measurement gap) during the measurement gap associated with the transmitted MG skip signaling, and/or the UE monitors the PDCCH or PDSCH (e.g., the UE may receive a DL data on the SPS resource that overlaps with the measurement gap) during the measurement gap associated with the transmitted MG skip signaling. Else (e.g., if the NW does not receive the MG skip signaling from the UE), the UE performs the measurement during the measurement gap.

Referring to FIG. 10, the network (NW) transmits the RRC message including information related to the measurement configuration for the UE. If the NW has received the MG skip signaling from the UE, the NW may perform transmitting PDCCH for DL assignment or UL grant for the UE, or monitor the UL data/signal transmitted from the UE during the measurement gap associated with the received MG skip signaling. For example, the NW may receive UL data on the configured grant (CG) resource of the UE that overlaps with the measurement gap. For another example, the NW may transmit DL data on the SPS resource of the UE that overlaps with the measurement gap. Else (e.g., if the NW does not receive the MG skip signaling from the UE), during the measurement gap, the NW does not transmit any DL data/control on PDCCH/DL-SCH, and/or monitor the PUCCH/PUSCH for the UE.

The MG skip procedure may be applied in downlink (DL). A UE may receive a measurement gap (MG) skip signaling for DL, if the NW buffer for the URLLC data of the UE (e.g., RLC buffer of a logical channel for URLLC, and/or HARQ buffer including the logical channel for URLLC) is not empty at the time point when the available resource for the MG skip of the UE is present. The DL resource for the MG skip may be configured with the same period as the measurement gap configured for the UE. The NW may trigger the MG skip for the UE when the URLLC data for the UE has arrived at the NW buffer. If the MG skip signaling has been received, the UE may perform the followings during the measurement gap associated with the received MG skip signaling:

transmitting HARQ feedback, SR, and/or CSI;
reporting SRS;
transmitting UL data on UL-SCH;
monitoring PDCCH; and/or
receiving DL data on DL-SCH.

In some implementations of the present disclosure, a UE receives a RRC message including configuration information for the MG skip. The configuration information may include periodic resource information for the MG skip signaling. Each MG skip resource is associated with a measurement gap of the UE. In some scenarios, it is preferable that the resource for the MG skip is configured with the same period as the measurement gap configured for the UE. In some scenarios, the UE may be configured with a logical channel or a data radio bearer for URLLC traffics, and the URLLC may have a characteristic of a sporadic/small data.

Figure 11:
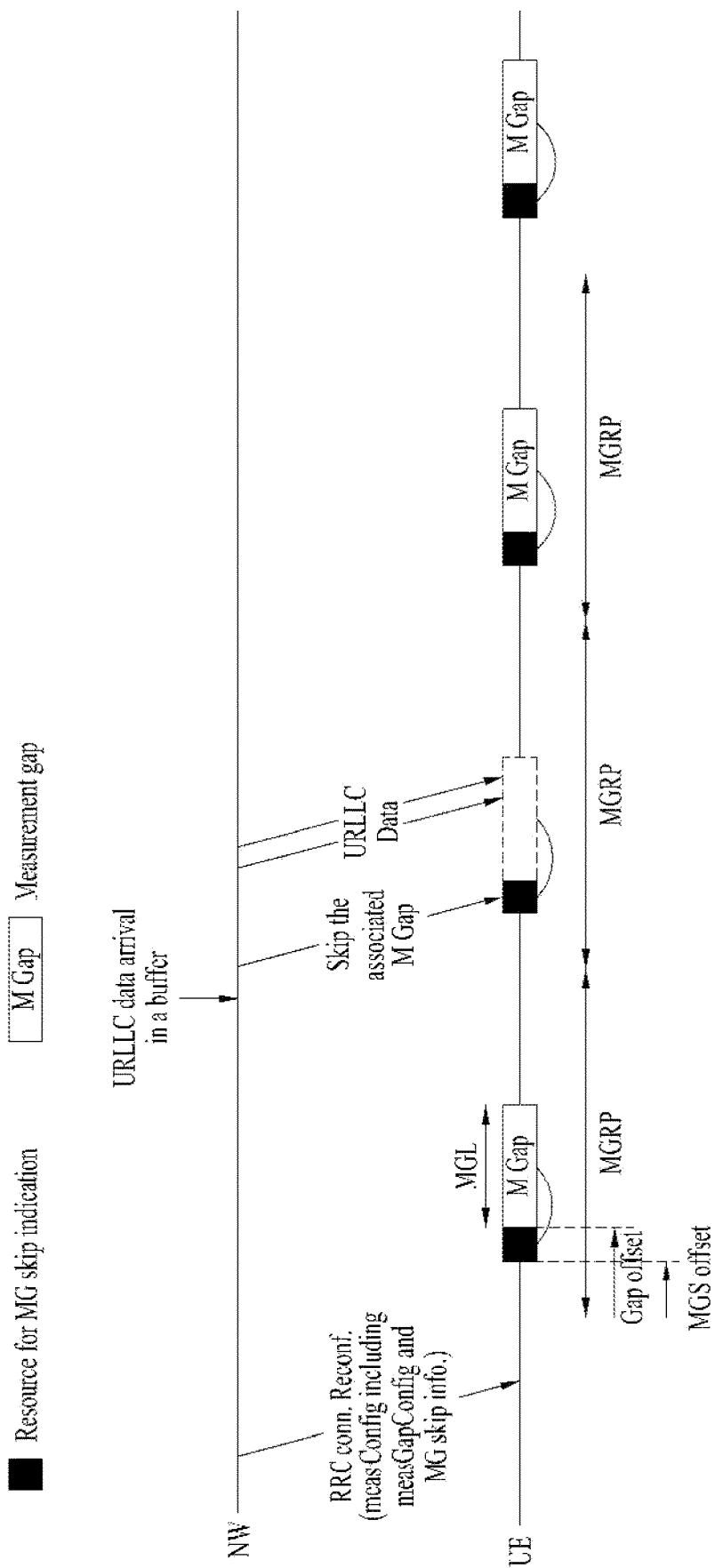
FIG. 11 illustrates an example of the network (NW) and UE behavior when measurement gap (MG) skip signaling is applied on DL.

FIG. 11 illustrates an example of the network (NW) and UE behavior when measurement gap (MG) skip signaling is applied on DL.

Referring to FIG. 11, the configuration information for the MG skip may be transmitted via the RRC connection reconfiguration message including the measurement gap configuration. The resources for the MG skip signaling may be periodically allocated on a physical channel (e.g., PDCCH), and the period of the resource may be configured with the same period, i.e., MGRP (Measurement Gap Repetition Period), as the measurement gap configured for the UE. The resource for the MG skip signaling can be located before the associated measurement gap. For example, the network may configure the offset for the MG skip signaling (MGS offset), wherein the value range of the MGS offset may be from −1 to 'gapOffset−1' (ms/slot/symbol/SubFrame/RadioFrame), i.e., the time point right before the associated measurement gap, as shown in FIG. 11. If the MG skip signaling is not transmitted by the NW, the UE shall perform the measurement during the measurement gap.

Figure 12:
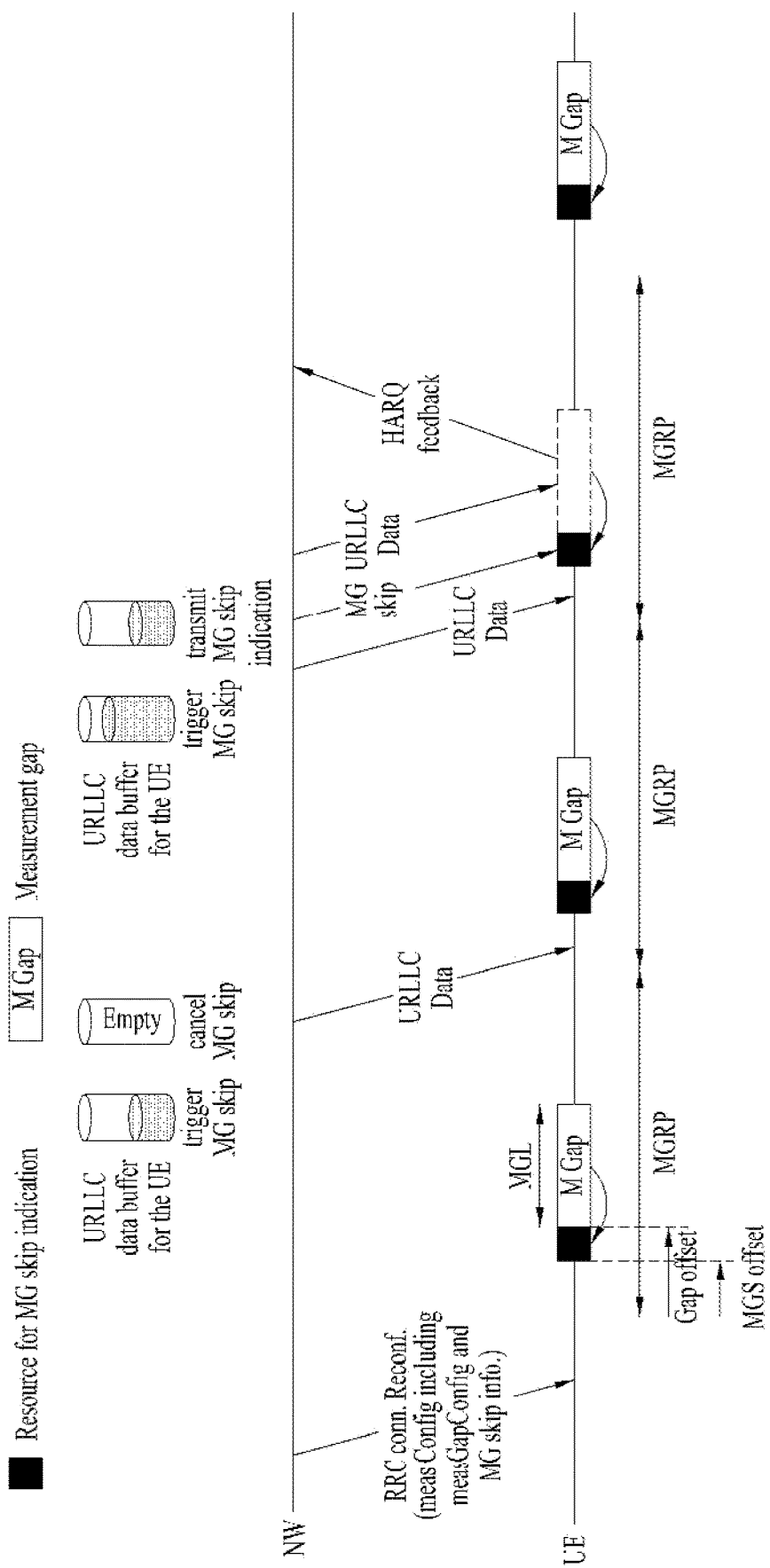
FIG. 12 illustrates another example of the network (NW) and UE behavior when measurement gap (MG) skip signaling is applied on DL.

FIG. 12 illustrates another example of the network (NW) and UE behavior when measurement gap (MG) skip signaling is applied on DL.

If the MG skip signaling has been triggered by the URLLC data, but the whole URLLC data in the buffer has been successfully transmitted (e.g., if the buffer for URLLC data of UE becomes empty) before the NW has a transmission occasion on the valid physical resource for the MG skip of the UE, the NW may cancel the triggered MG skip signaling of the UE.

Referring to FIG. 12, a UE may receive a RRC message including information related to the measurement configuration from a BS. The information related to the measurement configuration may include a measurement gap configuration. The measurement gap configuration may include the following parameters:

Measurement Gap Repetition Period (MGRP);
Measurement Gap Length;
Gap Offset;
Measurement gap skip configuration.

The measurement gap skip configuration may include the following parameters:

Resource information for the MG skip signaling; and
Logical channel ID(s) for which the MG skip is applied.

The resource information for the MG skip signaling may include the following parameters:

resource ID on PDCCH: for example, the resource ID on PDCCH may be provided via a new field in the DL assignment, or via a fixed resource region on PDCCH.
MG skip Offset: the value range may be from −1 to GapOffset−1, if Gap Offset range is from 0 to 'MGRP−1'.
MG skip signaling Period: the value may be same as the MGRP or MGRP based.

The UE periodically monitors the PDCCH resources for MG skip associated with the measurement gaps based on the received RRC message. If the UE has received the MG skip signaling, the UE shall not perform the measurement and may perform transmitting UL data/signal, or monitor the PDCCH, during the measurement gap associated with the received MG skip signaling. For example, the UE may transmit UL data on a configured grant (CG) resource that overlaps with the measurement gap. For another example, the UE may receive DL data on the SPS resource that overlaps with the measurement gap. Else (e.g., if the UE has not received the MG skip signaling on a resource for MG skip signaling), the UE performs the measurement during the measurement gap (associated with the resource).

Referring to FIG. 12, the NW transmits the RRC message including information related to the measurement configuration for the UE. The NW configures the PDCCH resources for MG skip associated with the measurement gaps for the UE based on the transmitted RRC message. If the NW has new DL data available for the logical channel indicated in the MG skip configuration, the NW may trigger the MG skip procedure of the UE. If all data for the logical channel, which had triggered the MG skip procedure, are transmitted, the NW cancels the MG skip procedure of the UE. When the NW has a MG skip signaling occasion on a valid PDCCH resource for the MG skip, the NW transmits the MG skip signaling (e.g., the MAC entity for the UE instructs the physical layer to signal the MG skip signaling on one valid PDCCH resource for the MG skip). If the NW has transmitted the MG skip signaling to the UE, the NW may transmit DL data/signal to the UE during the measurement gap associated with the transmitted MG skip signaling (e.g., the NW may transmit DL data on a SPS resource that overlaps with the measurement gap), or monitor PUCCH or PUSCH for the UE during the measurement gap associated with the transmitted MG skip signaling (e.g., the NW may receive UL data on a configured grant resource that overlaps with the measurement gap; or receive a SR on a PUCCH resource of the UE that overlaps with the measurement gap). Else, during the measurement gap, the NW does not transmit any DL data/control on PDCCH/DL-SCH to the UE, and/or monitor the PUCCH/PUSCH for the UE.

The processor(s) 102 and 202 may be configured to skip the measurement gap by transmitting/receiving the measurement gap skip signaling. A transceiver (hereinafter, UE transceiver) of a UE may receive configuration information for MG skip. The transceiver provide the configuration information for MG skip to a processor (hereinafter, UE processor), which is mounted on, installed on, or connected to the UE, under the control of the UE processor. The configuration information may include periodic resource information for the MG skip signaling. Each MG skip resource is associated with a measurement gap of the UE. A processor (hereinafter, NW processor) of a network may configure the resource for the MG skip with the same period as the measurement gap configured for the UE. The NW processor may configure the UE with a logical channel or a data radio bearer for URLLC traffics.

The UE processor is configured to transmit (or control the UE transceiver to transmit) measurement gap (MG) skip signaling, if the UE buffer for the URLLC data (e.g., RLC buffer of a logical channel for URLLC, and/or HARQ buffer including the logical channel for URLLC) is not empty at the time point when the available resource for the MG skip is present. The resource for the MG skip may be configured with the same period as the measurement gap configured for the UE. The UE processor may trigger the measurement gap (MG) skip when the URLLC data has arrived at the UE buffer. If the UE processor has transmitted the MG sip signaling during the measurement gap associated with the transmitted MG skip signaling, the UE processor may perform:

transmitting HARQ feedback, SR, and/or CSI;
reporting SRS;
transmitting UL data on UL-SCH; and/or
monitoring PDCCH.

If the UE processor has transmitted the MG skip signaling, the UE processor may not or does not perform the measurement during the measurement gap associated with the transmitted MG skip signaling. If the MG skip signaling has been triggered by the URLLC data, but the total URLLC data in the buffer has been successfully transmitted (i.e., if the buffer for URLLC data of UE becomes empty) before the UE processor has a transmission occasion on the valid physical resource for the MG skip, the UE processor may cancel the triggered MG skip signaling. If the MG skip signaling is triggered by a logical channel but an SR for the logical channel has not yet been transmitted by a UE, the NW processor receiving the MG skip signaling can handle it as if it received the SR for the corresponding logical channel. For example, via the MG skip signaling reception, the NW processor not only skips a measurement gap but also can distinguish that the UE requires a UL resource for the logical channel associated with the MG skip. If so, the UE processor may cancel the pending SR for the logical channel when the MG skip signaling is transmitted.

The MG skip procedure may be applied in downlink (DL). The NW processor may transmit (or control the NW transceiver to transmit) configuration information for the MG skip for DL. The NW processor may configure the resource for the MG skip with the same period as the measurement gap configured for the UE. The NW processor may trigger the measurement gap (MG) skip for the UE when the URLLC data for the UE has arrived at the NW buffer. The NW processor may transmit a MG skip signaling for DL if the NW buffer for the URLLC data of the UE (e.g., RLC buffer of a logical channel for URLLC, and/or HARQ buffer including the logical channel for URLLC) is not empty at the time point when the available resource for the MG skip of the UE is present. In this case, the UE processor receives a measurement gap (MG) skip signaling for DL. If the UE processor has received the MG skip signaling for DL during the measurement gap associated with the received MG skip signaling, the UE processor may perform receiving PDCCH for DL assignment or UL grant for the UE, or transmitting UL data/signal, during the measurement gap associated with the received MG skip signaling. If the UE processor has received the MG skip signaling for DL during the measurement gap associated with the received MG skip signaling, the UE processor may not or does not perform the measurement during the measurement gap associated with the received MG skip signaling.

In the meanwhile, in some cases where channel quality is low or a UE moves to another cell, skipping a measurement gap may result in loss of coverage of the UE. As a result, if always skipping a measurement gap that overlaps with transmission/reception of URLLC data, the UE would not only fail transmission of the URLLC data but also lose its coverage. Therefore, a new scheme is required to guarantee the coverage of a UE as well as the QoS requirement of URLLC service.

A UE in a cell where channel quality is low may fail to transmit/receive URLLC data. In this case, it may be better to measure neighbor frequencies than to transmit/receive URLLC data, and move to a cell with good channel quality.

In some implementations of the present disclosure, a UE transmits UL data and/or SR, or receives UL grant/DL assignment/DL data during the associated measurement gap by indicating the measurement gap skip to the network (e.g. BS) only when channel quality of the serving cell is good, whereby the requirement of the URLLC service may be satisfied.

Figure 13:
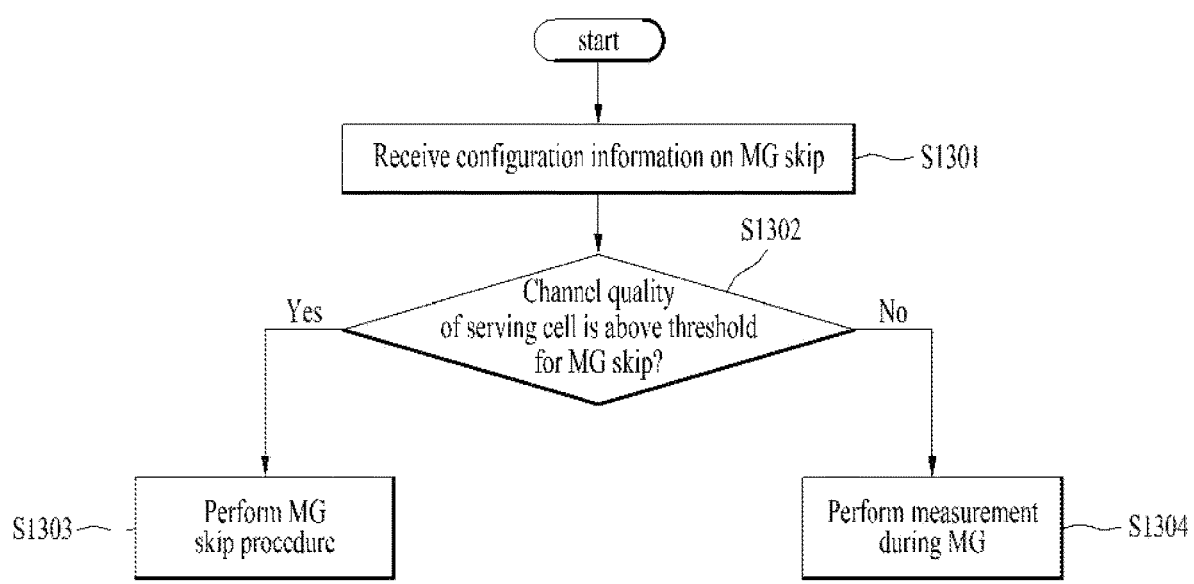
FIG. 13 illustrates another example of a measurement gap (MG) skip procedure according to some implementations of the present disclosure.

FIG. 13 illustrates another example of a measurement gap (MG) skip procedure according to some implementations of the present disclosure.

In some implementations of the present disclosure, a UE checks whether channel quality of the serving cell is above a certain threshold when the UE determines to skip the measurement gap (S1302).

Referring to FIG. 13, the UE performs the measurement during the measurement gap (S1304) if channel quality of the serving cell is below the threshold specified by the network (S1302, No). Even if the UE could skip the measurement gap to transmit/receive the URLLC data, the UE performs the measurement during the measurement gap if channel quality of the serving cell is below the threshold specified by the network. The UE performs the MG skip procedure (S1303) if channel quality of the serving cell is above the threshold (S1302, Yes). For example, if the UE could skip the measurement gap to transmit/receive the URLLC data and channel quality of the serving cell is above the threshold specified by the network, the UE does not perform the measurement and may transmit and/or receive URLLC data during the measurement gap.

In some scenarios, the UE may receive configuration information regarding the MG skip (S1301). In particular, the UE may receive at least the threshold value(s) of cell quality for the MG skip. The threshold value(s) for the MG skip may be configured for RSRP, RSRQ or SINR (e.g., trigger quantity or combinations of quantities (e.g., RSRP and RSRQ; RSRP and SINR; RSRQ and SINR; RSRP, RSRQ and SINR)). The UE may determine whether channel quality of the serving cell is above a certain threshold when the UE determines whether to skip the measurement gap (S1302). For example, for the MG skip, the UE compares the threshold value with the latest measurement result derived from the serving cell. In some scenarios, it is preferable to use the latest measurement result derived from the serving cell which would like to use during the measurement gap.

For the MG skip, alternatively, the UE may perform MG skip prohibition by using the same threshold value(s)/event(s) as the measurement reporting. For example, the UE may determine whether there is an ongoing measurement reporting procedure when it determines whether to skip the measurement gap. The UE does not trigger the MG skip procedure while performing the measurement reporting procedure. If the UE does not have an ongoing measurement reporting procedure when it determines whether to skip the measurement gap, the UE triggers the MG skip procedure.

If the UE has new data available for URLLC service and the cell quality is above the threshold, the UE informs the NW of the MG skip and performs the followings during the measurement gap:

transmitting HARQ feedback, SR, and/or CSI;
reporting SRS;
transmitting UL data on UL-SCH; and/or
monitoring PDCCH.

If the UE informs the NW that the UE skips the measurement gap, the UE does not perform the measurement during the measurement gap.

In some implementations of the present disclosure, a UE may receive information regarding trigger conditions for the MG skip. The information regarding trigger conditions for the MG skip may be transmitted via a RRC message including a measurement gap configuration. The information regarding trigger conditions for the MG skip may include at least a threshold value for channel quality (e.g., RSRP threshold, RSRQ threshold, SINR threshold) and/or a logical channel ID which is used as trigger conditions for the MG skip. The information regarding trigger conditions for the MG skip may also include physical resource information for a MG skip indication which informs that the UE skips the associated measurement gap.

Figure 14:
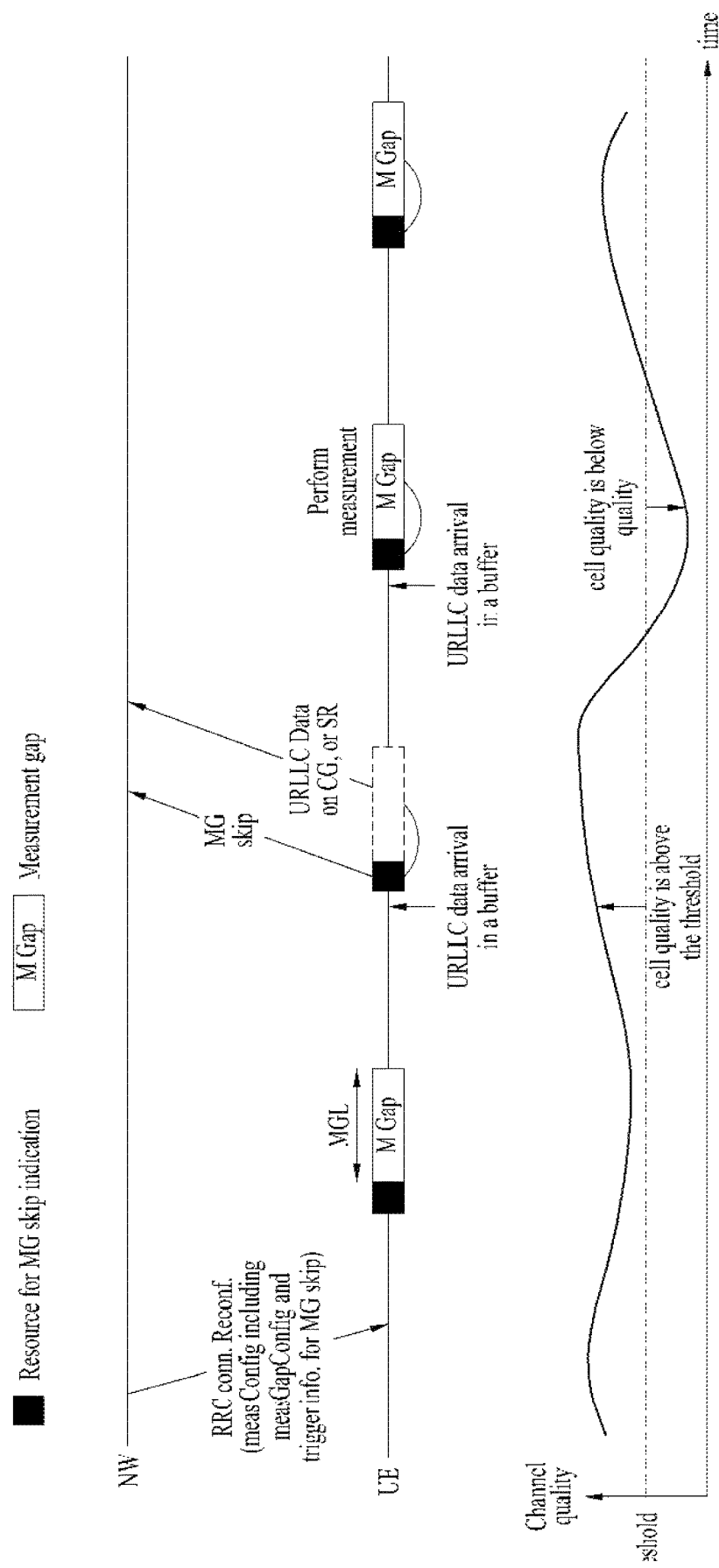
FIG. 14 illustrates an example of the network (NW) and UE behavior related to the measurement gap skip procedure considering channel quality.

FIG. 14 illustrates an example of the network (NW) and UE behavior related to the measurement gap skip procedure considering channel quality.

A threshold value for the MG skip may be transmitted via a RRC connection reconfiguration message including a measurement gap configuration. Given that the resource for a MG skip signaling/indication is configured for a UE by the NW, the UE checks cell quality before informing the NW with the MG skip. The UE informs the NW the UE skips the measurement gap, only when the cell quality is above the threshold. If the MG skip is not informed to the NW by the UE, the UE performs the measurement during the measurement gap. If the MG skip is informed to the NW by the UE, the UE transmits URLLC data on a configured grant (CG) resource or SR PUCCH, and/or receives URLLC data, or monitors PDCCH.

Referring to FIG. 14, a UE may receive a RRC message including information related to a measurement configuration from a NW. The information related to a measurement configuration may include a measurement gap configuration. The measurement gap configuration may include a MGRP, a measurement gap length, a gap offset, and the measurement gap configuration. The measurement gap skip configuration may further include a threshold value for the MG skip, in addition to the parameters described before (e.g. resource information for the MG skip signaling and a logical channel ID(s) for which the MG skip is applied). The UE configures the PUCCH resources for the MG skip associated with the measurement gap(s) based on the received RRC message. If the UE has new UL data available for the logical channel indicated in the MG skip configuration; and if channel quality of the serving cell is above the threshold for MG skip, the UE triggers the MG skip procedure. If all data for the logical channel which had triggered the MG skip procedure are transmitted, the UE cancels the MG skip procedure. When the UE has a MG skip signaling occasion on a valid PUCCH resource for the MG skip, the UE transmits the MG skip signaling (e.g., the MAC entity instructs the physical layer to signal the MG skip signalling on one valid PUCCH resource for the MG skip). If the UE has transmitted the MG skip signaling, the UE may perform transmitting UL data/signal during the measurement gap associated with the transmitted MG skip signaling. For example, if the UE has transmitted the MG skip signaling, the UE may transmit UL data on a configured grant (CG) resource that overlaps with the measurement gap. If the UE has transmitted the MG skip signaling, the UE may monitors the PDCCH or PDSCH during the measurement gap associated with the transmitted MG skip signaling. For example, if the UE has transmitted the MG skip signaling, the UE may receive DL data on a SPS resource that overlaps with the measurement gap associated with the transmitted MG skip signaling. If the UE has transmitted the MG skip signaling on a resource configured for the MG skip signaling, the UE performs the measurement during the measurement gap associated with the resource.

Referring to FIG. 14, the NW transmits the RRC message including information related to the measurement configuration for the UE. If the NW has received the MG skip signaling from the UE, the NW may perform transmitting PDCCH for DL assignment or UL grant for the UE, or monitor UL data/signal transmitted from the UE, during the measurement gap associated with the received MG skip signaling. For example, the NW may receive UL data on a configured grant (CG) resource of the UE that overlaps with the measurement gap. For another example, the NW may transmit DL data on a SPS resource of the UE that overlaps with the measurement gap. If the NW has received the MG skip signaling on a resource configured for the MG skip signaling, the NW does not transmit any DL data/control on PDCCH/DL-SCH, and/or monitor the PUCCH/PUSCH for the UE, during the measurement gap associated with the resource, In some implementations of the present disclosure, a UE processor may be configured to skip the measurement gap only when channel quality of the serving cell is good. The UE transceiver may receive configuration information regarding the MG skip procedure, and provide it for the UE processor operably connected to the UE transceiver. The configuration information regarding the MG skip procedure may include at least threshold value(s) of cell quality for the MG skip. The threshold value(s) for the MG skip may be configured for RSRP, RSRQ or SINR, i.e., trigger quantity or combinations of quantities. The UE processor may be configured to determine whether channel quality of the serving cell is above a certain threshold when the UE processor determines whether to skip the measurement gap. For example, for the MG skip, the UE processor may compare the threshold value with the latest measurement result derived from the serving cell.

The UE processor is configured to perform the measurement during the measurement gap if channel quality of the serving cell is below the threshold specified by the network. Even if the UE could skip the measurement gap to transmit/receive the URLLC data, the UE processor may perform the measurement during the measurement gap if channel quality of the serving cell is below the threshold specified by the network. The UE processor is configured to perform the MG skip procedure if channel quality of the serving cell is above the threshold. For example, if the UE processor could skip the measurement gap to transmit/receive the URLLC data and channel quality of the serving cell is above the threshold specified by the network, the UE processor does not perform the measurement and may transmit and/or receive (or control the UE transceiver to transmit and/or receive) the URLLC data during the measurement gap.

Alternatively, the UE processor may perform MG skip prohibition by using the same threshold value(s)/event(s) as the measurement reporting. For example, the UE processor may be configured to determine whether there is an ongoing measurement reporting procedure when it determines whether to skip the measurement gap. The UE processor does not trigger the MG skip procedure while performing the measurement reporting procedure. If the UE processor does not have an ongoing measurement reporting procedure when it determines whether to skip the measurement gap, the UE processor triggers the MG skip procedure. If the UE memory has new data available for URLLC service and the cell quality is above the threshold, the UE processor transmits the measurement gap skip to the network (NW) and may perform the followings during the measurement gap:
 transmitting HARQ feedback, SR, and/or CSI;
 reporting SRS;
 transmitting UL data on UL-SCH; and/or
 monitoring PDCCH.

If the UE processor informs the NW that the UE skips the measurement gap, the UE processor may not perform the measurement during the measurement gap. If the UE memory has new UL data available for the logical channel indicated in the MG skip configuration and if channel quality of the serving cell is above the threshold for MG skip, the UE processor may trigger the MG skip procedure. If all data for the logical channel which had triggered the MG skip procedure has been transmitted, the UE processor may cancels the MG skip procedure. When the UE processor has a MG skip signaling occasion on a valid PUCCH resource for the MG skip, the UE processor transmit the MG skip signaling (e.g., the UE processor may be configured such that the MAC entity in the UE processor instructs the physical layer in the UE processor to signal the MG skip signalling on one valid PUCCH resource for MG skip). If the UE processor has transmitted the MG skip signaling, the UE processor may perform transmitting UL data/signal during a measurement gap associated with the transmitted MG skip signaling (e.g. transmitting UL data on a CG resource that overlaps with the measurement gap); monitor PDCCH or PDSCH during the measurement gap (e.g. the UE may receive DL data on a SPS resource that overlaps with the measurement gap). If the UE memory has new UL data available for the logical channel indicated in a MG skip configuration but if channel quality of the serving cell is below a threshold for the MG skip, the UE processor performs the measurement during the measurement gap.

A NW processor may generate a RRC message including information related to the measurement configuration for a UE, and transmit (or control a NW transceiver to transmit) the RRC message. If the NW processor has received the MG skip signaling from the UE, the NW processor may perform transmitting PDCCH for DL assignment or UL grant for the UE, or monitor UL data/signal transmitted from the UE during the measurement gap associated with the received MG skip signaling. Else, during the measurement gap, the NW processor does not transmit any DL data/control on PDCCH/DL-SCH, and/or monitor PUCCH/PUSCH for the UE.

As mentioned above, skipping a measurement gap to satisfy the URLLC service requirement and transmitting URLLC data during the measurement gap may cause a problem that the coverage of the UE cannot be guaranteed because the UE can transmit unconditionally URLLC data before measuring the channel status of the neighbor cell. To solve this problem, in some implementations of the present disclosure, a UE skips a measurement gap in order to perform URLLC data transmission when the following condition is met:

Condition 1: timer for MG skip prohibition has expired.
Condition 2: measurement gap counter (N)>=minimum number of MG ($MG_{min}$).

Figure 15:
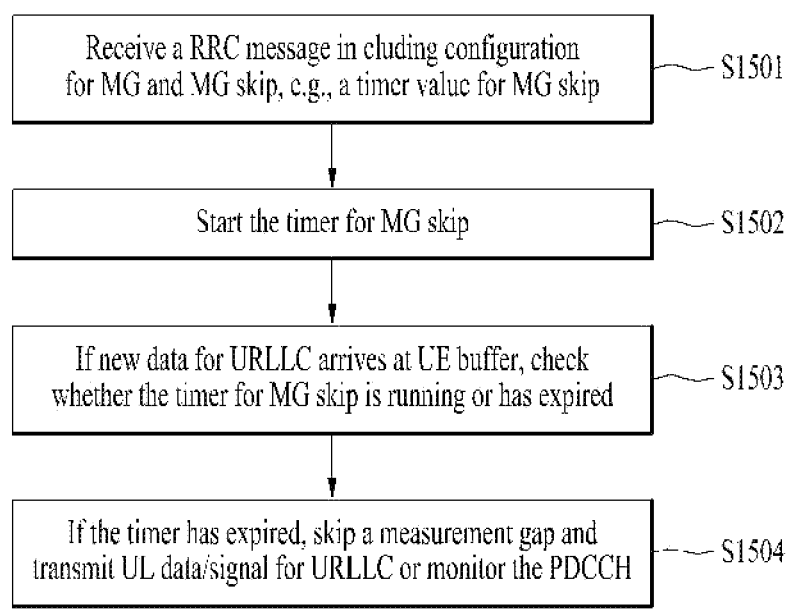
FIG. 15 illustrates an example of a measurement gap (MG) skip procedure based on a condition according to some implementations of the present disclosure.

FIG. 15 illustrates an example of a measurement gap (MG) skip procedure based on a condition according to some implementations of the present disclosure.

In some implementations of the present disclosure, if a UE receives a RRC message with a measurement gap configuration including a timer value for the MG skip prohibition, the UE starts the timer upon receiving the configuration. While the timer is running, the UE performs the measurement for the neighbor cell(s) during the measurement gap. In other words, the measurement gap skip is prohibited while the timer is running. However, if the timer has expired, the UE may skip the measurement gap for transmitting/receiving URLLC data. Especially, in some implementations of the present disclosure, a UE may skip a measurement gap when the following events occur:

measurement gap overlaps with the time for transmitting/receiving URLLC data; and
timer for the MG skip prohibition has expired.

The UE (re)starts the timer after skipping a measurement gap. The UE may (re)start the timer after skipping the maximum number of consecutive measurement gaps (MGs), if information on the maximum number of consecutive MGs that the MG cap skip has been transmitted to the UE by the network (e.g. BS).

Figure 16:
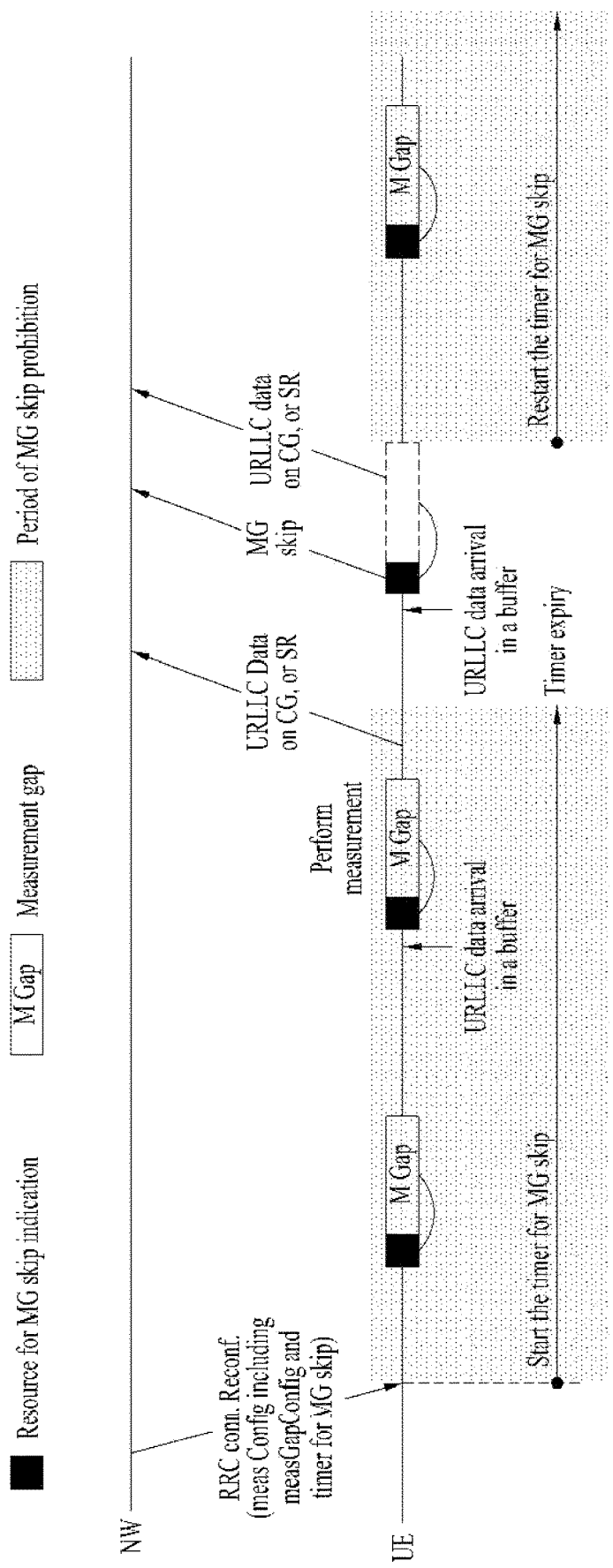
FIG. 16 illustrates an example of measurement and data transmission based on some implementations of the present disclosure.

FIG. 16 illustrates an example of measurement and data transmission based on some implementations of the present disclosure. In particular, FIG. 16 illustrates an example of a MG skip procedure based on a timer for MG skip prohibition. FIG. 16, "RRC conn. Recof." denotes an RRC connection reconfiguration message, "CG" denotes a configured grant, "SR" denotes a scheduling request, and "NW" denotes the network.

Alternatively, in some implementations of the present disclosure, a UE checks whether or not a counter for the MG skip prohibition exceeds the minimum number of MG, e.g., $MG_{min}$. If a UE receives a RRC message with a measurement gap configuration including the minimum number of MG ($MG_{min}$), the UE increments the MG counter (N) upon performing the measurement during a measurement gap. While the MG counter is less than the $MG_{min}$, the UE performs the measurement for the neighbor cell(s) during measurement gap(s). In other words, the measurement gap skip is prohibited while the counter is less than $MG_{min}$. However, if the MG counter is equal or larger than the $MG_{min}$, the UE may skip a measurement gap for transmitting/receiving URLLC data. Especially, in some implementations of the present disclosure, a UE may skip the measurement gap when the following events occur:

measurement gap overlaps with the time for transmitting/receiving URLLC data; and
MG counter (N)>=minimum number of MG ($MG_{min}$).

The UE (re)sets the MG counter to 0 after skipping a measurement gap. The UE may (re)sets the counter to 0 after the UE skips the maximum number of consecutive MGs, if information on the maximum number of consecutive MGs that the UE can skip has been transmitted to the UE by the NW (e.g. BS).

Figure 17:
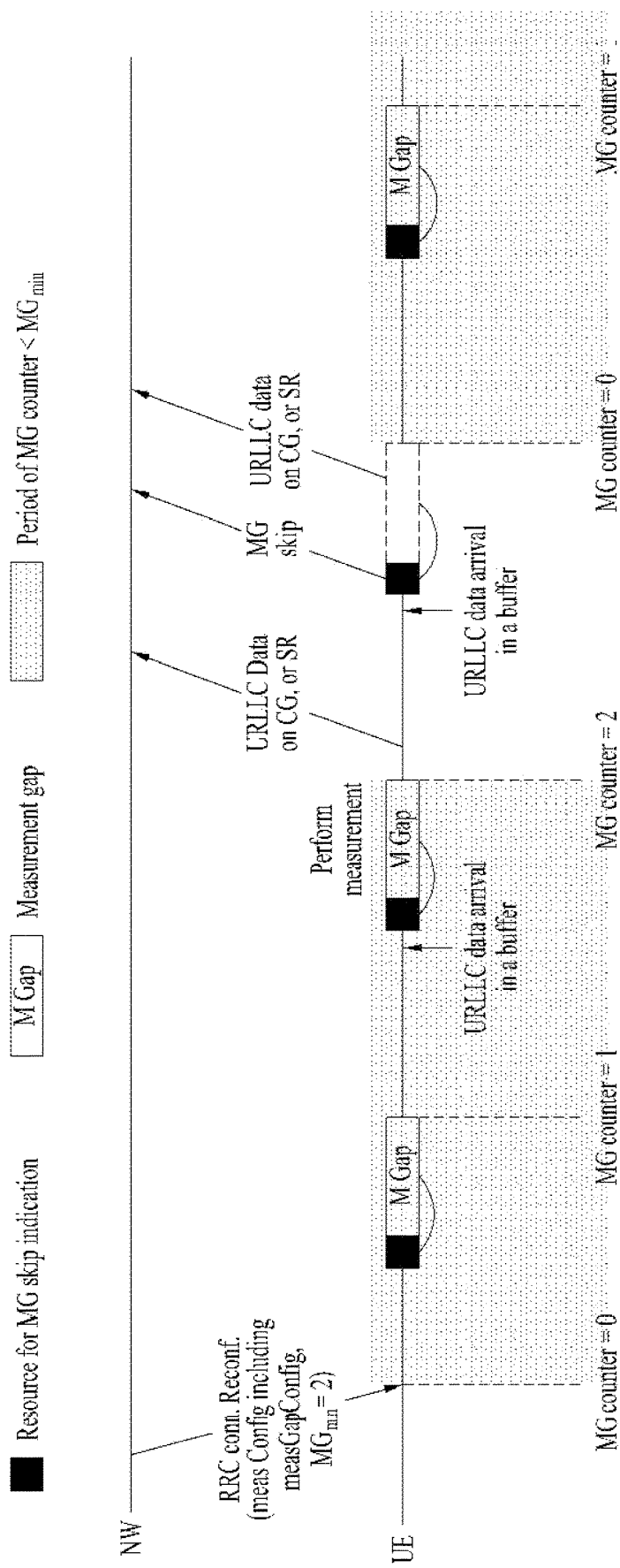
FIG. 17 illustrates another example of measurement and data transmission based on some implementations of the present disclosure.

FIG. 17 illustrates another example of measurement and data transmission based on some implementations of the present disclosure. In particular, FIG. 17 illustrates an example of a MG skip procedure based on a measurement gap counter for MG skip prohibition. In FIG. 17, "RRC conn. Recof." denotes an RRC connection reconfiguration message, "CG" denotes a configured grant, "SR" denotes a scheduling request, and "NW" denotes the network.

If a measurement gap overlaps with the time for transmitting/receiving URLLC data and if the timer has expired or the counter>=$MG_{min}$, the UE may inform the NW that the UE skips the measurement gap, and perform the followings during the measurement gap:

transmitting HARQ feedback, SR, and/or CSI;
reporting SRS;
transmitting UL data on UL-SCH; and/or
monitoring PDCCH.

If the UE informs the Network that the UE skips a measurement gap, the UE does not perform the measurement during the measurement gap.

In some implementations of the present disclosure, a UE may receive information on trigger condition(s) for the MG skip. The information on trigger condition(s) for the MG skip may be transmitted to the UE via a RRC message including a measurement gap configuration. The information on trigger condition(s) for the MG skip may include at least a parameter for the MG skip prohibition and/or a logical channel ID which is used as trigger condition(s) for the MG skip. In particular, the parameter for MG skip prohibition may be a timer value ($T_{MG\_skip}$) or counter of MG ($MG_{prohibition\_counter}$).

In some implementations of the present disclosure, the UE may be configured with a logical channel or a data radio bearer for URLLC traffics, and the URLLC traffics may have a characteristic of a sporadic/small data.

Additionally, in some implementations of the present disclosure, the UE may receive a threshold value of channel quality for neighbor cell. If the threshold value is configured with the measurement gap skip, the UE skips a measurement gap when the following events occur:

measurement gap overlaps with the time for transmitting/receiving URLLC data;
timer for MG skip prohibition has expired, or MG counter (N)>=minimum number of MG ($MG_{min}$); and
the latest measurement result of neighbor cell(s) is below the threshold.

Figure 18:
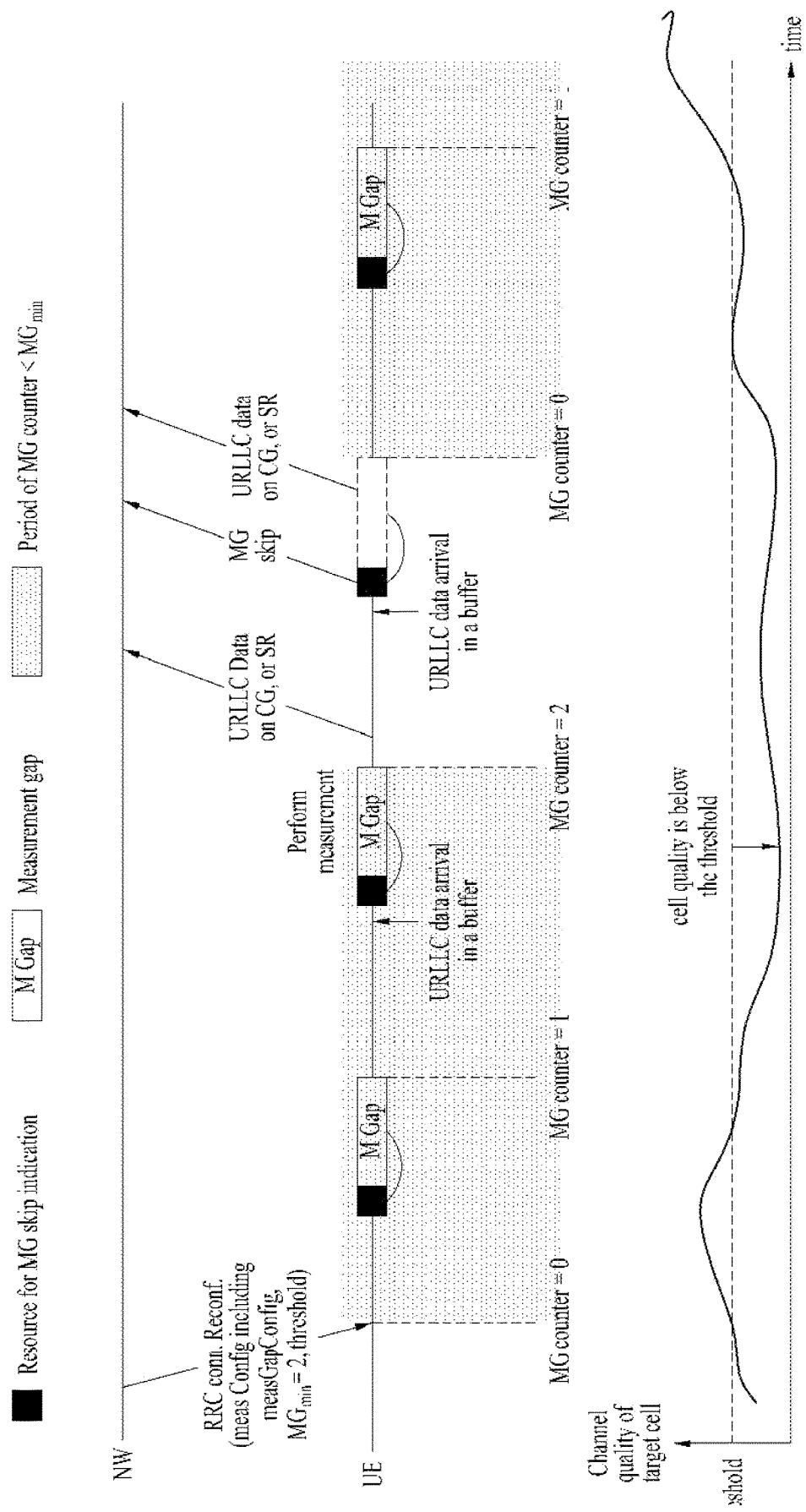
FIG. 18 illustrates another example of measurement and data transmission based on implementations of the present disclosure.

FIG. 18 illustrates another example of measurement and data transmission based on implementations of the present disclosure. In particular, FIG. 18 illustrates an example of a MG skip procedure based on Condition 2 and a threshold value. Although FIG. 18 illustrates an example of a MG skip procedure based on Condition 2 and a threshold value, a MG skip procedure based on Condition 1 and a threshold value can be performed in the similar manner to or same manner as the example shown in FIG. 18. In FIG. 18, "RRC conn. Recof." denotes an RRC connection reconfiguration message, "CG" denotes a configured grant, "SR" denotes a scheduling request, and "NW" denotes the network.

Referring to FIG. 18, a UE may receive a RRC message including information related to a measurement configuration from the NW. The information related to a measurement configuration may include a measurement gap configuration. The measurement gap configuration may include a MGRP, a measurement gap length, a gap offset, and the measurement gap configuration. The measurement gap skip configuration may further include i) a timer value for MG skip prohibition or the minimum number of MG ($MG_{min}$) and ii) a threshold value for channel quality of neighbor cell, in addition to the parameters described before (e.g. resource information for the MG skip signaling and a logical channel ID(s) for which the MG skip is applied). The UE configures PUCCH resources for the MG skip associated with measurement gaps based on the received RRC message, and starts the timer for MG skip prohibition, or set the MG counter to 0. If the UE has new UL data available for the logical channel indicated in the MG skip configuration, if the timer for MG skip prohibition has expired, or the MG counter is larger than or equal to $MG_{min}$, and if the channel quality measured during the latest measurement gap is below the threshold, the UE triggers the MG skip procedure. If all data for the logical channel which had triggered the MG skip procedure are transmitted, the UE cancels the MG skip procedure. When the UE has a MG skip signaling occasion on a valid PUCCH resource for the MG skip, the UE transmits the MG skip signaling (e.g., the MAC entity instructs the physical layer to signal the MG skip signalling on one valid PUCCH resource for the MG skip). If the UE has transmitted the MG skip signaling, the UE may perform to transmit UL data/signal during a measurement gap associated with the transmitted MG skip signaling, transmit UL data on a CG resource that overlaps with the measurement gap, and/or monitor PDCCH or PDSCH during the measurement gap. For example, if the UE has transmitted the MG skip signaling, the UE may receive DL data on a SPS resource that overlaps with the measurement gap. Else, the UE performs the measurement during the measurement gap.

Referring to FIG. 18, the NW (e.g. BS) transmits the RRC message including information related to the measurement configuration for the UE. If the NW has received the MG skip signaling from the UE, the NW may perform transmitting PDCCH for DL assignment or UL grant for the UE, or monitor UL data/signal transmitted from the UE during the measurement gap associated with the received MG skip signaling. For example, the NW may receive UL data on a CG resource of the UE that overlaps with the measurement gap. For another example, the NW may transmit DL data on a SPS resource of the UE that overlaps with the measurement gap. Else, during the measurement gap, the NW does not transmit any DL control/data on PDCCH/DL-SCH, and/or monitor the PUCCH/PUSCH for the UE.

In some implementations of the present disclosure, a UE transmits a UL data/SR, or receives UL grant/DL assignment/DL data during the associated measurement gap by indicating the measurement gap skip to the network (e.g. BS) only after measuring the channel status of the neighbour cell(s) via the configured measurement gap, thereby satisfying the requirement for the URLLC service while guaranteeing the UE coverage.

Uplink/downlink transmission of the present disclosure is subject to the physical layer processing at a transmitting side before transmission via radio interface, and the radio signals carrying the uplink/downlink transmission are subject to the physical layer processing at a receiving side. For example, UL/DL data of the present disclosure may be subject to the physical layer processing as follows.

Figure 19:
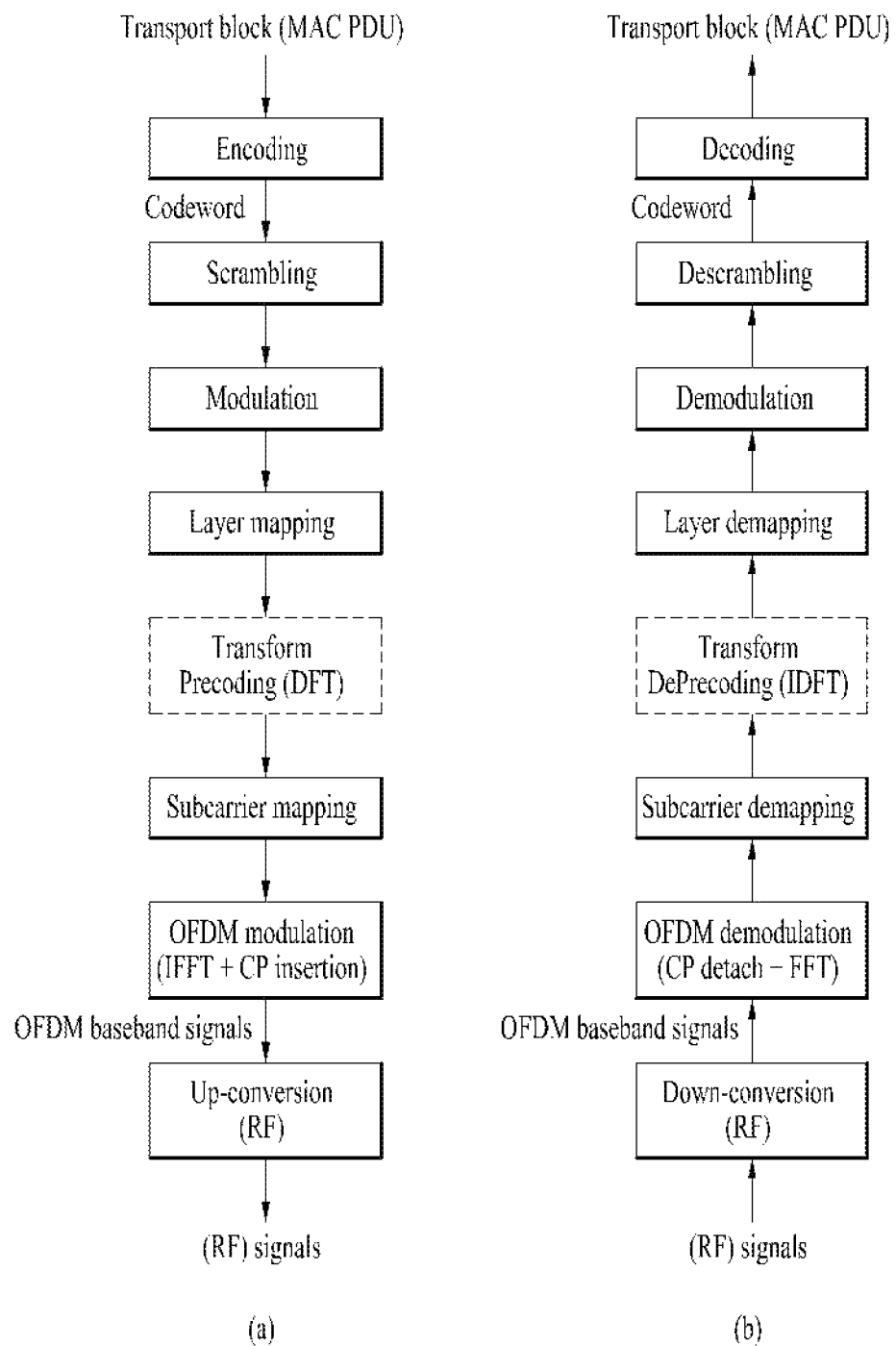
FIG. 19 illustrates an example of physical layer processing for some implementations of the present disclosure.

FIG. 19 illustrates an example of physical layer processing for some implementations of the present disclosure.

FIG. 19(a) illustrates an example of physical layer processing at a transmitting side.

The following tables show the mapping of the transport channels (TrCHs) and control information to its corresponding physical channels. In particular, Table 9 specifies the mapping of the uplink transport channels to their corresponding physical channels, Table 10 specifies the mapping of the uplink control channel information to its corresponding physical channel, Table 11 specifies the mapping of the downlink transport channels to their corresponding physical channels, and Table 12 specifies the mapping of the downlink control channel information to its corresponding physical channel.

TABLE 9

| TrCH | Physical Channel |
|---|---|
| UL-SCH | PUSCH |
| RACH | PRACH |

TABLE 10

| Control information | Physical Channel |
|---|---|
| UCI | PUCCH, PUSCH |

TABLE 11

| TrCH | Physical Channel |
|---|---|
| DL-SCH | PDSCH |
| BCH | PBCH |
| PCH | PDSCH |

TABLE 12

| Control information | Physical Channel |
|---|---|
| DCI | PDCCH |

Encoding

Data and control streams from/to MAC layer are encoded to offer transport and control services over the radio transmission link in the PHY layer. For example, a transport block from MAC layer is encoded into a codeword at a transmitting side. Channel coding scheme is a combination of error detection, error correcting, rate matching, interleaving and transport channel or control information mapping onto/splitting from physical channels.

In the 3GPP NR system, following channel coding schemes are used for the different types of TrCH and the different control information types.

TABLE 13

| TrCH | Coding scheme |
|---|---|
| UL-SCH | LDPC |
| DL-SCH | |
| PCH | |
| BCH | Polar code |

TABLE 14

| Control Information | Coding scheme |
| --- | --- |
| DCI | Polar code |
| UCI | Block code |
|  | Polar code |

For transmission of a DL transport block (i.e. a DL MAC PDU) or a UL transport block (i.e. a UL MAC PDU), a transport block CRC sequence is attached to provide error detection for a receiving side. In the 3GPP NR system, the communication device uses low density parity check (LDPC) codes in encoding/decoding UL-SCH and DL-SCH. The 3GPP NR system supports two LDPC base graphs (i.e. two LDPC base matrixes): LDPC base graph 1 optimized for small transport blocks and LDPC base graph 2 for larger transport blocks. Either LDPC base graph 1 or 2 is selected based on the size of the transport block and coding rate R. The coding rate R is indicated by the modulation coding scheme (MCS) index $I_{MCS}$. The MCS index is dynamically provided to a UE by PDCCH scheduling PUSCH or PDSCH, provided to a UE by PDCCH activating or (re-) initializing the UL configured grant 2 or DL SPS, or provided to a UE by RRC signaling related to the UL configured grant Type 1. If the CRC attached transport block is larger than the maximum code block size for the selected LDPC base graph, the CRC attached transport block may be segmented into code blocks, and an additional CRC sequence is attached to each code block. The maximum code block sizes for the LDPC base graph 1 and the LDPC base graph 2 are 8448 bits and 3480 bits, respectively. If the CRC attached transport block is not larger than the maximum code block size for the selected LDPC base graph, the CRC attached transport block is encoded with the selected LDPC base graph. Each code block of the transport block is encoded with the selected LDPC base graph. The LDPC coded blocks are then individually rat matched. Code block concatenation is performed to create a codeword for transmission on PDSCH or PUSCH. For PDSCH, up to 2 codewords (i.e. up to 2 transport blocks) can be transmitted simultaneously on the PDSCH. PUSCH can be used for transmission of UL-SCH data and layer 1/2 control information. Although not shown in FIG. 19, the layer 1/2 control information may be multiplexed with the codeword for UL-SCH data.

Scrambling and Modulation

The bits of the codeword are scrambled and modulated to generate a block of complex-valued modulation symbols.

Layer Mapping

The complex-valued modulation symbols of the codeword are mapped to one or more multiple input multiple output (MIMO) layers. A codeword can be mapped to up to 4 layers. A PDSCH can carry two codewords, and thus a PDSCH can support up to 8-layer transmission. A PUSCH supports a single codeword, and thus a PUSCH can support up to 4-layer transmission.

Transform Precoding

The DL transmission waveform is conventional OFDM using a cyclic prefix (CP). For DL, transform precoding (in other words, discrete Fourier transform (DFT)) is not applied.

The UL transmission waveform is conventional OFDM using a CP with a transform precoding function performing DFT spreading that can be disabled or enabled. In the 3GPP NR system, for UL, the transform precoding can be optionally applied if enabled. The transform precoding is to spread UL data in a special way to reduce peak-to-average power ratio (PAPR) of the waveform. The transform precoding is a form of DFT. In other words, the 3GPP NR system supports two options for UL waveform: one is CP-OFDM (same as DL waveform) and the other one is DFT-s-OFDM. Whether a UE has to use CP-OFDM or DFT-s-OFDM is configured by a BS via RRC parameters.

Subcarrier Mapping

The layers are mapped to antenna ports. In DL, for the layers to antenna ports mapping, a transparent manner (non-codebook based) mapping is supported and how beamforming or MIMO precoding is performed is transparent to the UE. In UL, for the layers to antenna ports mapping, both the non-codebook based mapping and a codebook based mapping are supported.

For each antenna port (i.e. layer) used for transmission of the physical channel (e.g. PDSCH, PUSCH), the complex-valued modulation symbols are mapped to subcarriers in resource blocks allocated to the physical channel.

OFDM Modulation

The communication device at the transmitting side generates a time-continuous OFDM baseband signal on antenna port p and subcarrier spacing configuration u for OFDM symbol/in a TTI for a physical channel by adding a cyclic prefix (CP) and performing IFFT. For example, for each OFDM symbol, the communication device at the transmitting side may perform inverse fast Fourier transform (IFFT) on the complex-valued modulation symbols mapped to resource blocks in the corresponding OFDM symbol and add a CP to the IFFT-ed signal to generate the OFDM baseband signal.

Up-Conversion

The communication device at the transmitting side up-converts the OFDM baseband signal for antenna port p, subcarrier spacing configuration u and OFDM symbol l to a carrier frequency $f_0$ of a cell to which the physical channel is assigned.

The processors 102 and 202 in FIG. 1B may be configured to perform encoding, schrambling, modulation, layer mapping, transform precoding (for UL), subcarrier mapping, and OFDM modulation. The processors 102 and 202 may control the transceivers 106 and 206 connected to the processors 102 and 202 to up-convert the OFDM baseband signal onto the carrier frequency to generate radio frequency (RF) signals. The radio frequency signals are transmitted through antennas 108 and 208 to an external device.

FIG. 19(b) illustrates an example of physical layer processing at a receiving side.

The physical layer processing at the receiving side is basically the inverse processing of the physical layer processing at the transmitting side.

Frequency Down-Conversion

The communication device at a receiving side receives RF signals at a carrier frequency through antennas. The transceivers 106 and 206 receiving the RF signals at the carrier frequency down-converts the carrier frequency of the RF signals into the baseband in order to obtain OFDM baseband signals.

OFDM Demodulation

The communication device at the receiving side obtains complex-valued modulation symbols via CP detachment and FFT. For example, for each OFDM symbol, the communication device at the receiving side removes a CP from the OFDM baseband signals and performs FFT on the CP-removed OFDM baseband signals to obtain complex-valued modulation symbols for antenna port p, subcarrier spacing u and OFDM symbol l.

Subcarrier Demapping

The subcarrier demapping is performed on the complex-valued modulation symbols to obtain complex-valued modulation symbols of a corresponding physical channel. For example, the processor(s) 102 may obtain complex-valued modulation symbols mapped to subcarriers belong to PDSCH from among complex-valued modulation symbols received in a bandwidth part. For another example, the processor(s) 202 may obtain complex-valued modulation symbols mapped to subcarriers belong to PUSCH from among complex-valued modulation symbols received in a bandwidth part.

Transform De-Precoding

Transform de-precoding (e.g. IDFT) is performed on the complex-valued modulation symbols of the uplink physical channel if the transform precoding has been enabled for the uplink physical channel. For the downlink physical channel and for the uplink physical channel for which the transform precoding has been disabled, the transform de-precoding is not performed.

Layer Demapping.

The complex-valued modulation symbols are de-mapped into one or two codewords.

Demodulation and Descrambling

The complex-valued modulation symbols of a codeword are demodulated and descrambled into bits of the codeword.

Decoding

The codeword is decoded into a transport block. For UL-SCH and DL-SCH, either LDPC base graph 1 or 2 is selected based on the size of the transport block and coding rate R. The codeword may include one or multiple coded blocks. Each coded block is decoded with the selected LDPC base graph into a CRC-attached code block or CRC-attached transport block. If code block segmentation was performed on a CRC-attached transport block at the transmitting side, a CRC sequence is removed from each of CRC-attached code blocks, whereby code blocks are obtained. The code blocks are concatenated into a CRC-attached transport block. The transport block CRC sequence is removed from the CRC-attached transport block, whereby the transport block is obtained. The transport block is delivered to the MAC layer.

In the above described physical layer processing at the transmitting and receiving sides, the time and frequency domain resources (e.g. OFDM symbol, subcarriers, carrier frequency) related to subcarrier mapping, OFDM modulation and frequency up/down conversion can be determined based on the resource allocation (e.g., UL grant, DL assignment).

For uplink data transmission, the processor(s) 102 of the present disclosure may apply (or control the transceiver(s) 106 to apply) the above described physical layer processing of the transmitting side to UL data/signal of the present disclosure to transmit the UL data/signal wirelessly. For uplink data reception, the processor(s) 102 of the present disclosure may apply (or control the transceiver(s) 106 to apply) the above described physical layer processing of the receiving side to received radio signals to obtain the UL data/signal of the present disclosure.

For downlink data transmission, the processor(s) 202 of the present disclosure may apply (or control the transceiver(s) 206 to apply) the above described physical layer processing of the transmitting side to DL data/signal of the present disclosure to transmit the data unit wirelessly. For downlink data reception, the processor(s) 202 of the present disclosure may apply (or control the transceiver(s) 206 to apply) the above described physical layer processing of the receiving side to received radio signals to obtain DL data/signal of the present disclosure.

As described above, the detailed description of the preferred implementations of the present disclosure has been given to enable those skilled in the art to implement and practice the disclosure. Although the disclosure has been described with reference to exemplary implementations, those skilled in the art will appreciate that various modifications and variations can be made in the present disclosure without departing from the spirit or scope of the disclosure described in the appended claims. Accordingly, the disclosure should not be limited to the specific implementations described herein, but should be accorded the broadest scope consistent with the principles and novel features disclosed herein.

INDUSTRIAL APPLICABILITY

The implementations of the present disclosure are applicable to a network node (e.g., BS), a UE, or other devices in a wireless communication system.

The invention claimed is:

1. A method for transmitting uplink signals by a user equipment (UE) in a wireless communication system, the method comprising:
   receiving configuration information regarding a measurement gap (MG);
   transmitting a MG skip indication associated with the MG; and
   transmitting the uplink signals during the MG,
   wherein the MG skip indication is transmitted in response to satisfying of conditions for the UE to skip measurements during the MG, and the conditions comprise:
   data of a specific logical channel is available for transmission in the UE, and
   channel quality of a serving cell is above a threshold.

2. The method according to claim 1,
   wherein the uplink signals include the data of the specific logical channel.

3. The method according to claim 1, further comprising:
   wherein the configuration information includes information regarding a resource used for the MG skip indication, and
   wherein the MG skip indication is transmitted using the resource based on the configuration information.

4. The method according to claim 3,
   wherein the MG skip indication is transmitted based on data of a specific logical channel being available for transmission in the UE at the time when the resource configured for the MG skip indication is present.

5. The method according to claim 1, further comprising:
   skipping measurements during the MG.

6. The method according to claim 1, wherein the conditions further comprise:
   a timer for prohibiting the UE from skipping measurements during MGs is not running, and
   wherein the UE performs the measurements during each MG while the timer is running.

7. The method according to claim 1, wherein the conditions further comprise:
   a counter for prohibiting the UE from skipping measurements during MGs does not reach a specific value, and
   wherein the UE increments the counter by 1 per MG, and performs the measurements during each MG while the counter does not reach the specific value.

8. A user equipment (UE) of transmitting uplink signals in a wireless communication system, the UE comprising:
a transceiver;
at least one processor; and
at least one computer memory operably connectable to the at least one processor and storing instructions that, when executed, cause the at least one processor to perform operations comprising:
receiving configuration information regarding a measurement gap (MG);
transmitting a MG skip indication associated with the MG; and
transmitting the uplink signals during the MG,
wherein the MG skip indication is transmitted in response to satisfying of conditions for the UE to skip measurements during the MG, and the conditions comprise:
data of a specific logical channel is available for transmission in the UE, and
channel quality of a serving cell is above a threshold.

9. The UE according to claim 8,
wherein the uplink signals include the data of the specific logical channel.

10. The UE according to claim 8, further comprising:
wherein the configuration information includes information regarding a resource used for the MG skip indication, and
wherein the MG skip indication is transmitted using the resource based on the configuration information.

11. The UE according to claim 10, wherein the MG skip indication is transmitted based on data of a specific logical channel being available for transmission in the UE at the time when the resource configured for the MG skip indication is present.

12. The UE according to claim 8, wherein the operations further comprise:
skipping measurements during the MG.

13. The UE according to claim 8, wherein the conditions further comprise:
a timer for prohibiting the UE from skipping measurements during MGs is not running, and
wherein the UE performs the measurements during each MG while the timer is running.

14. The UE according to claim 8, wherein the conditions further comprise:
a counter for prohibiting the UE from skipping measurements during MGs does not reach a specific value, and
wherein the UE increments the counter by 1 per MG, and performs the measurements during each MG while the counter does not reach the specific value.

* * * * *